J. E. CONZELMAN.
ELEVATOR AND TANK CONSTRUCTION.
APPLICATION FILED OCT. 11, 1911.

1,045,522.

Patented Nov. 26, 1912.

17 SHEETS—SHEET 1.

Witnesses:
Lottie M. Fox.
Bertha von Behrens.

Inventor:
John E. Conzelman.
By Hugh K. Wagner
His Attorney.

J. E. CONZELMAN.
ELEVATOR AND TANK CONSTRUCTION.
APPLICATION FILED OCT. 11, 1911.
1,045,522.
Patented Nov. 26, 1912.
17 SHEETS—SHEET 2.
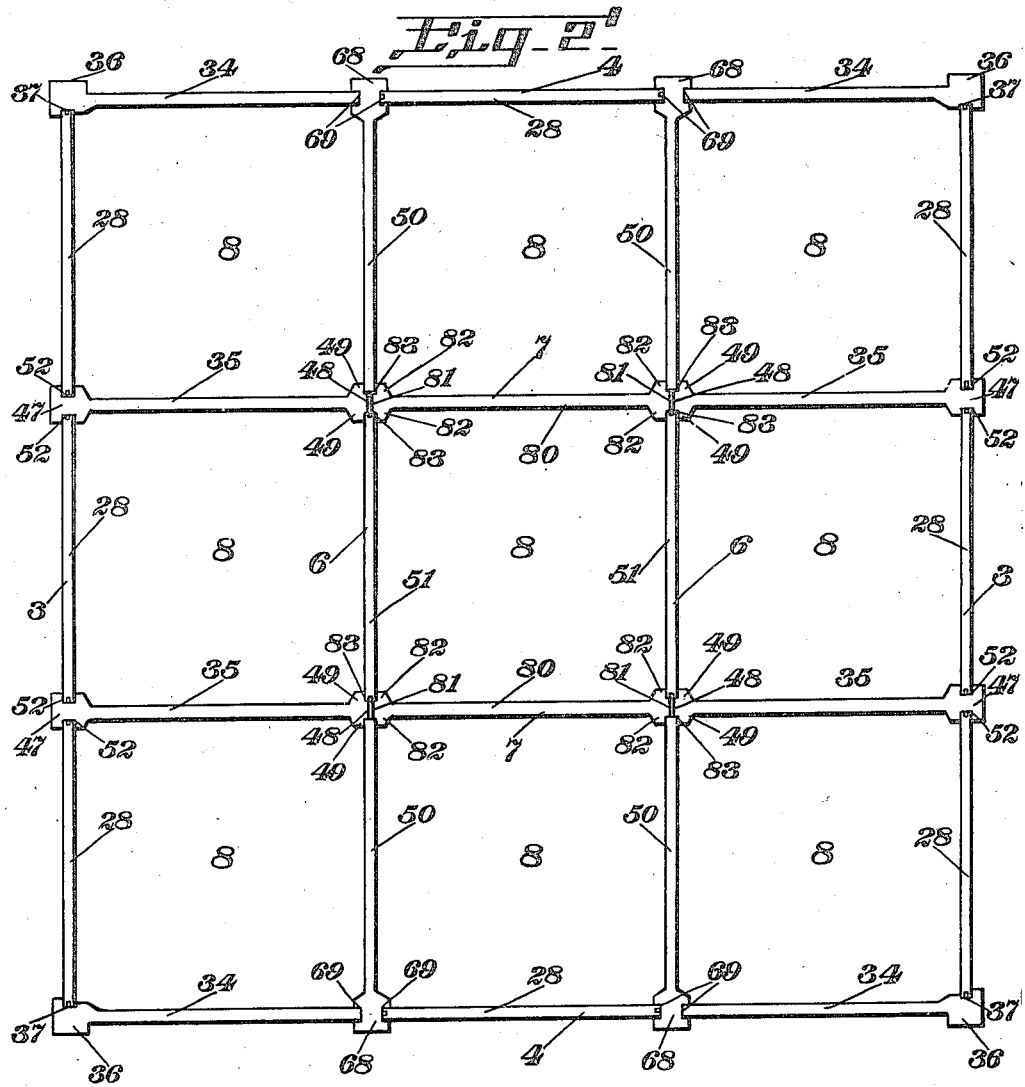

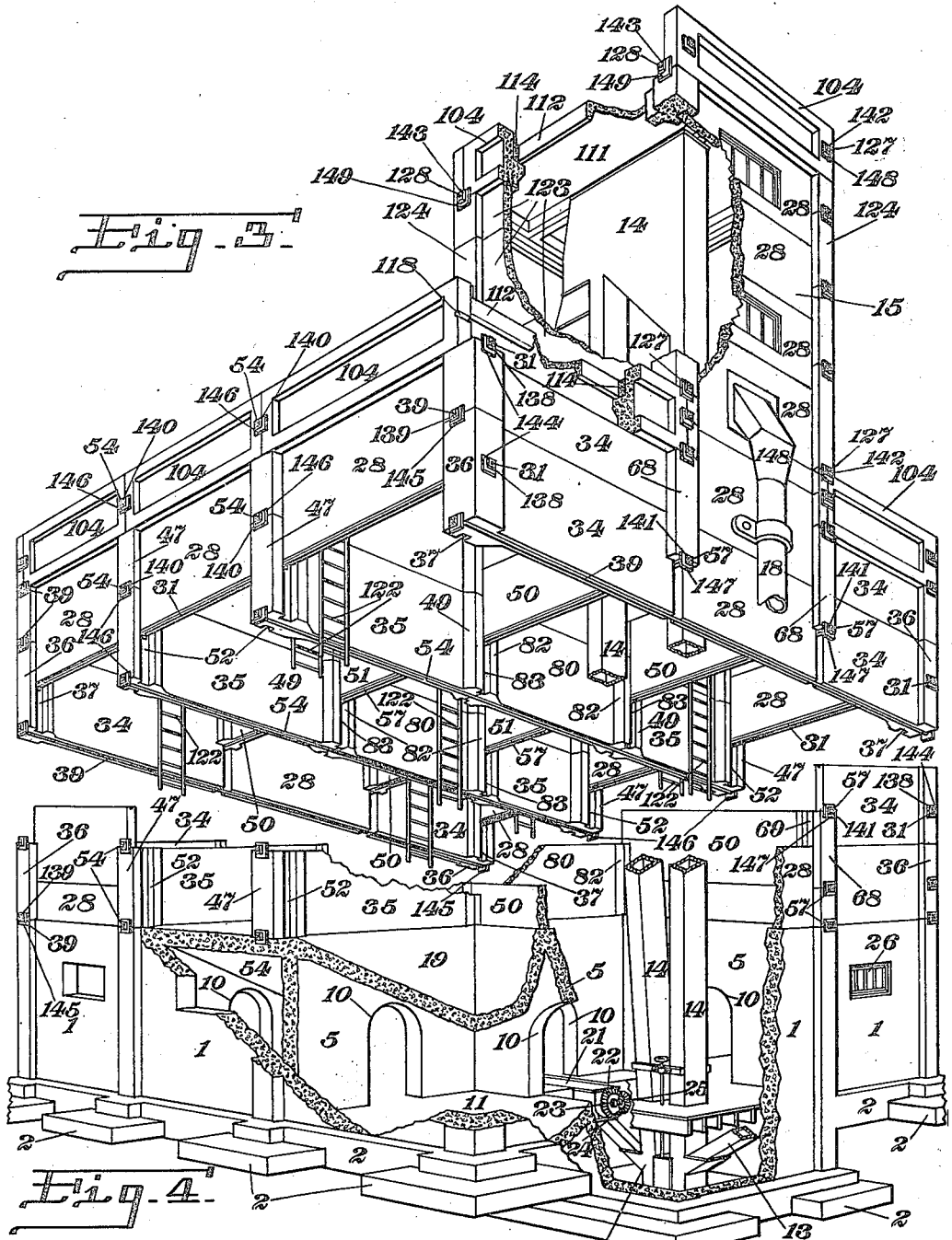

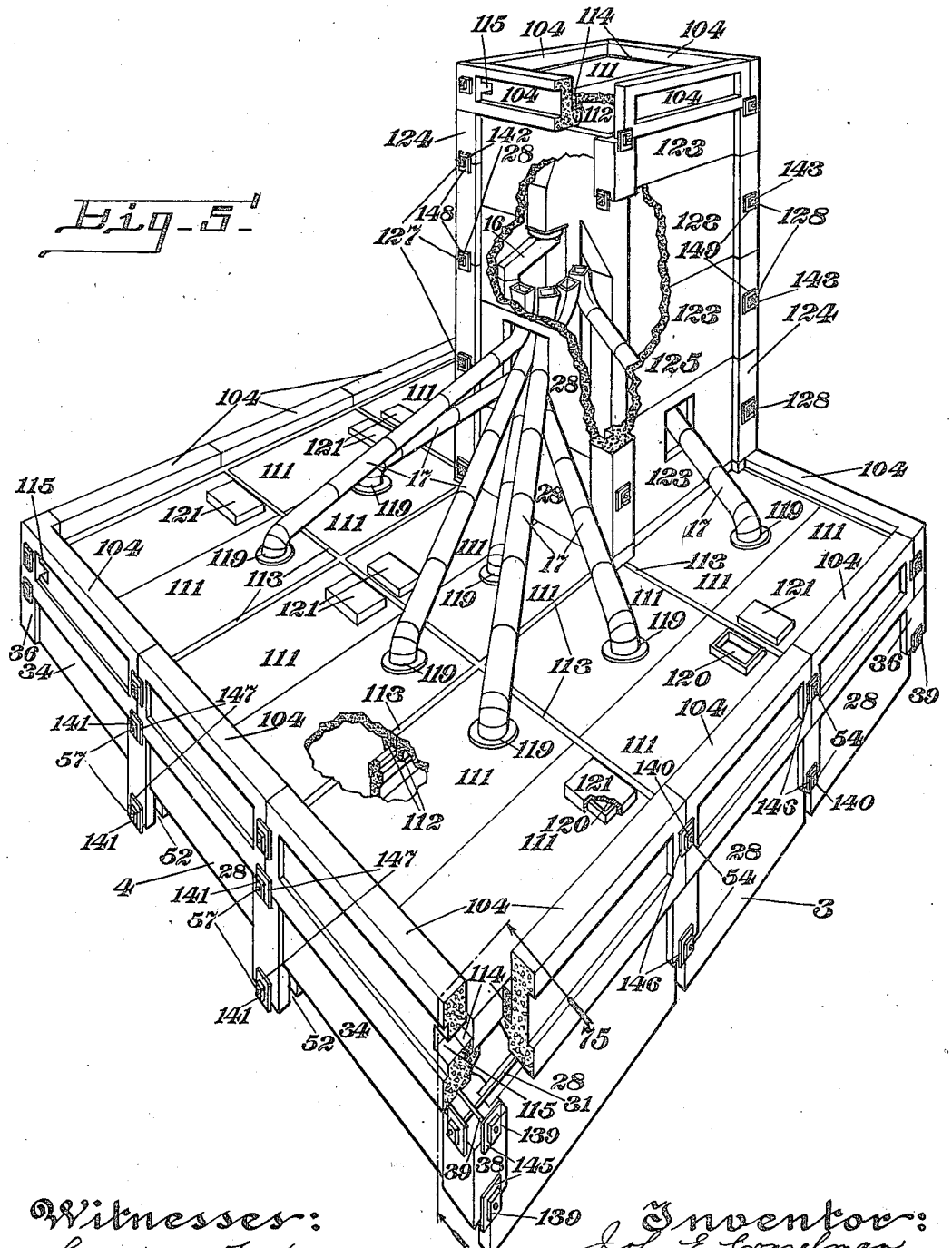

J. E. CONZELMAN.
ELEVATOR AND TANK CONSTRUCTION.
APPLICATION FILED OCT. 11, 1911.

1,045,522.

Patented Nov. 26, 1912.

17 SHEETS—SHEET 5.

Witnesses:
Lottie M. Fox.
Bertha von Behrens.

Inventor:
John E. Conzelman,
By Hugh K. Wagner,
His Attorney.

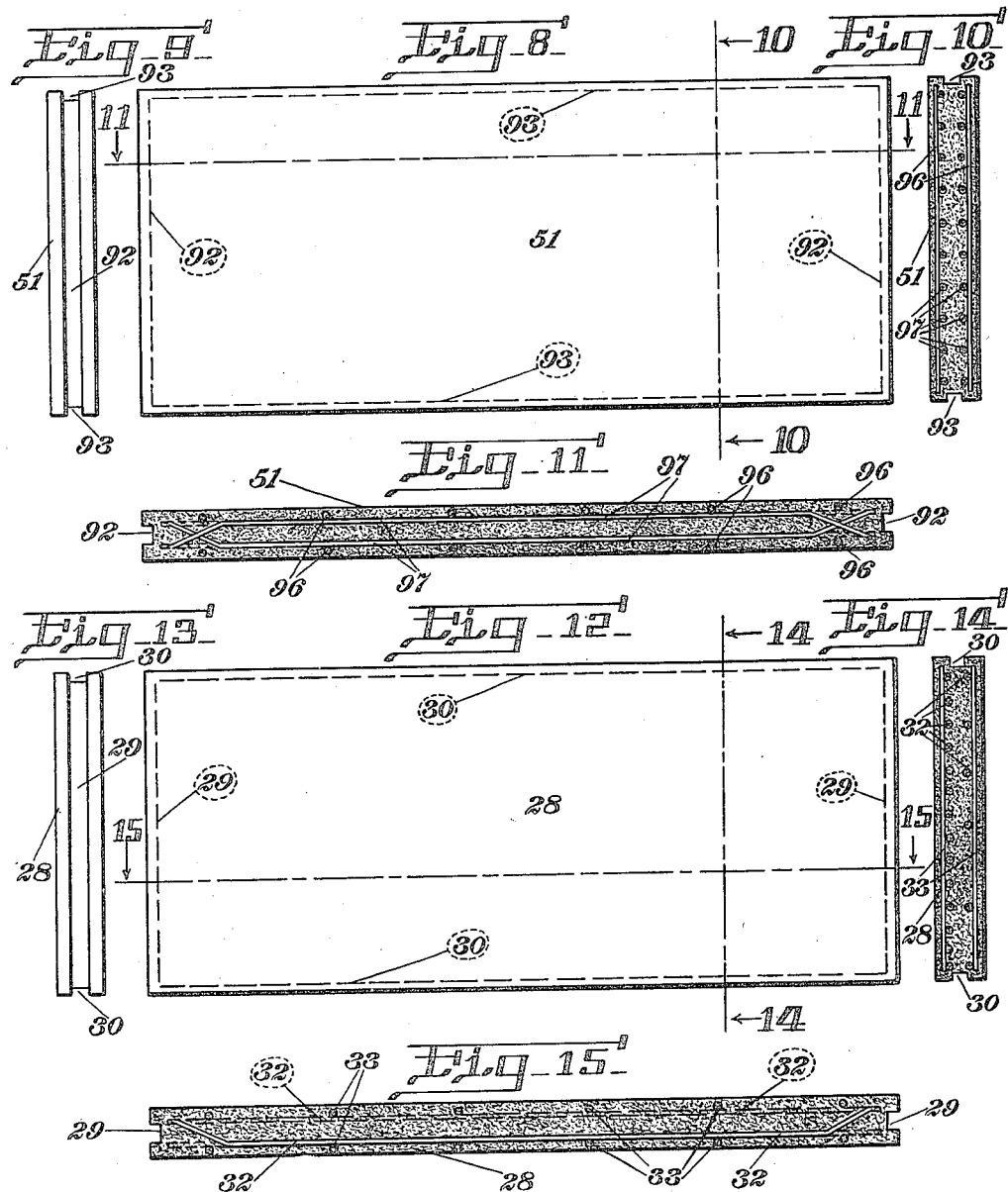

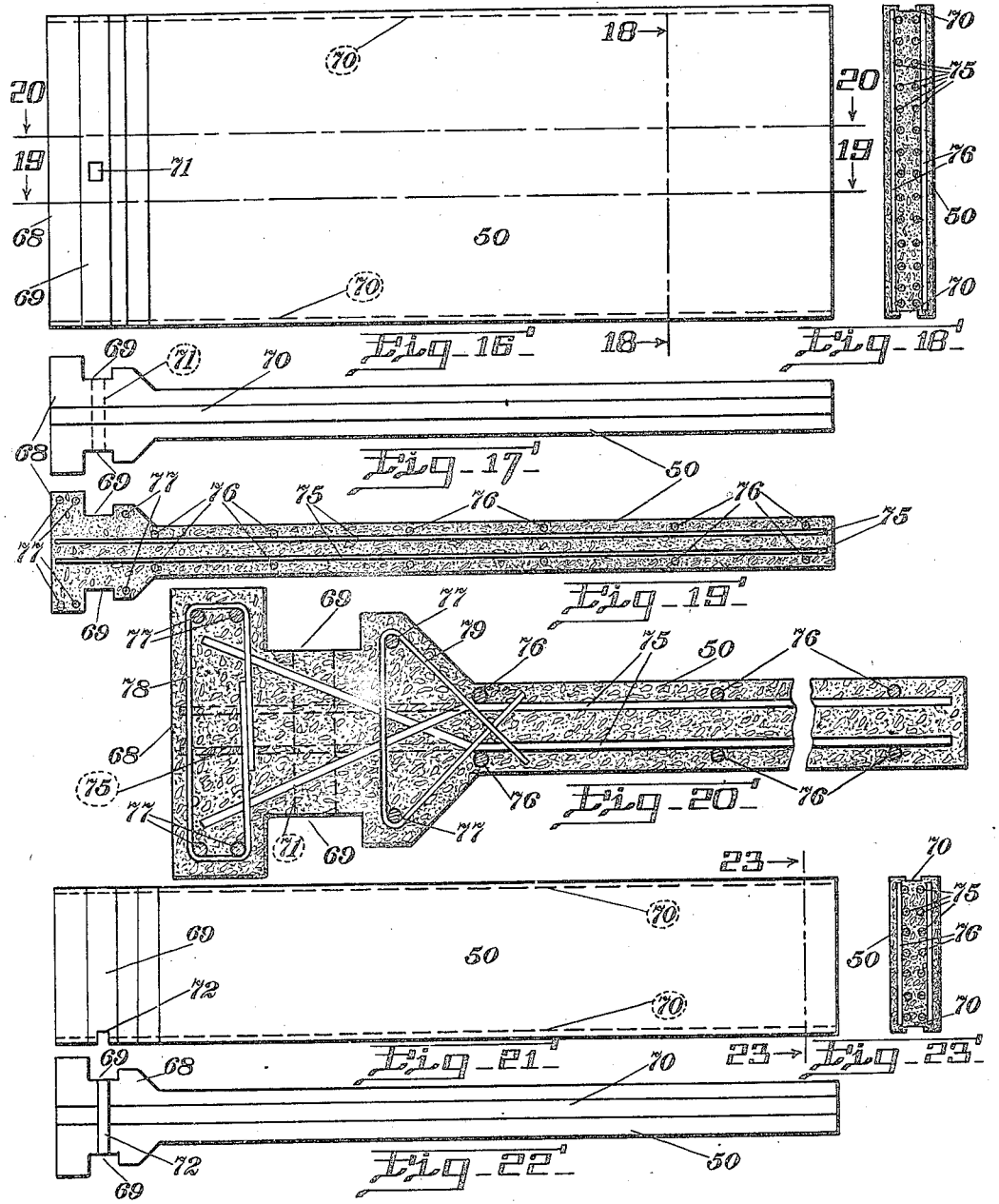

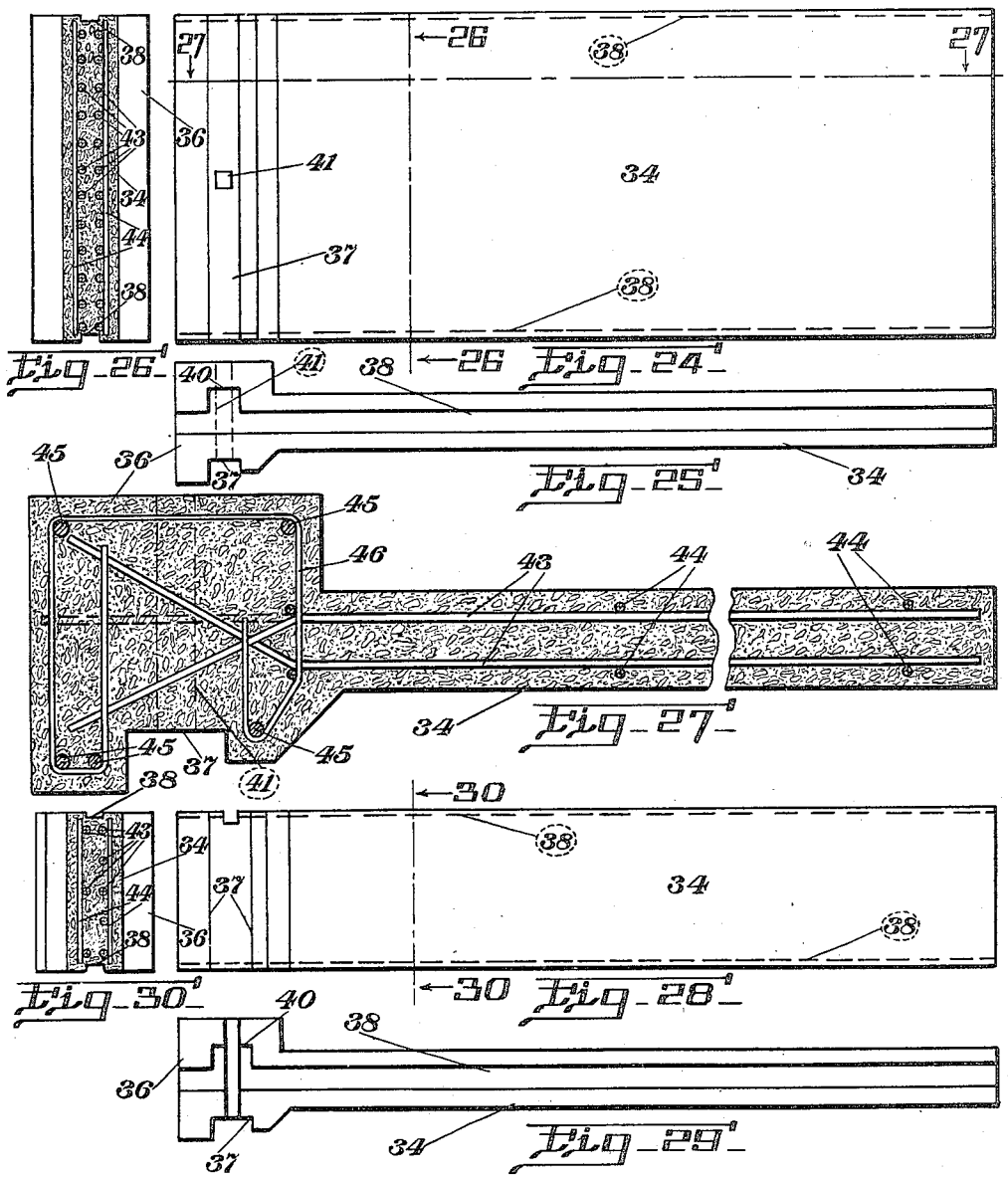

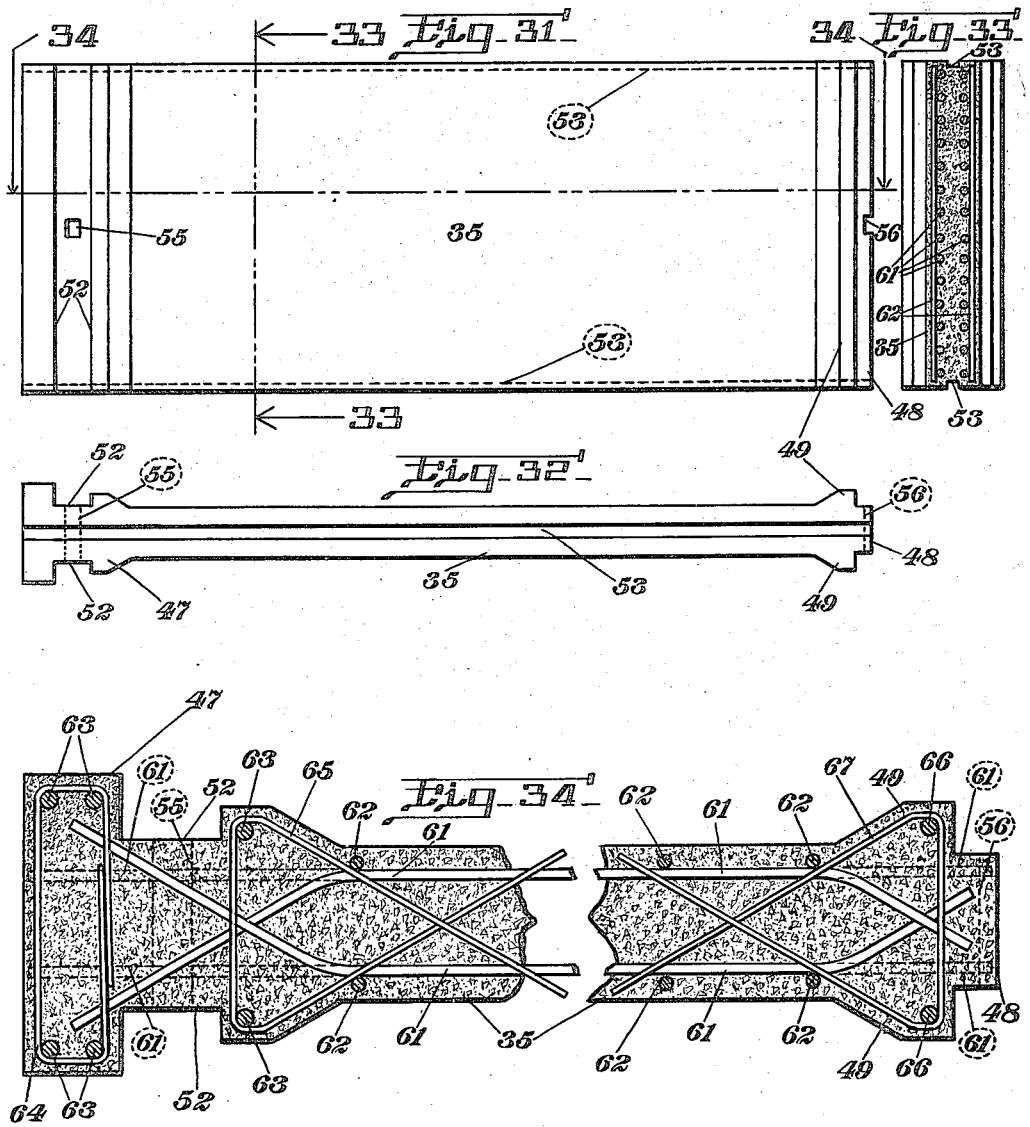

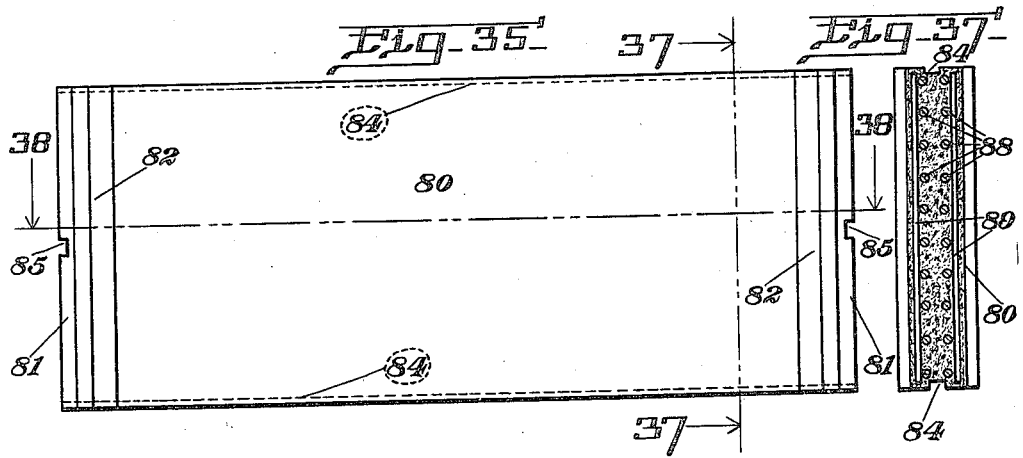
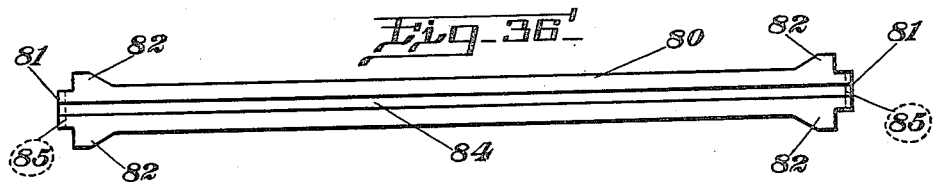
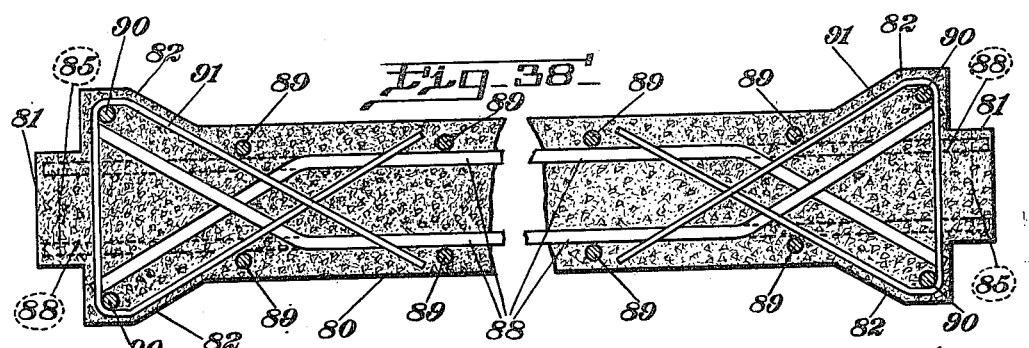

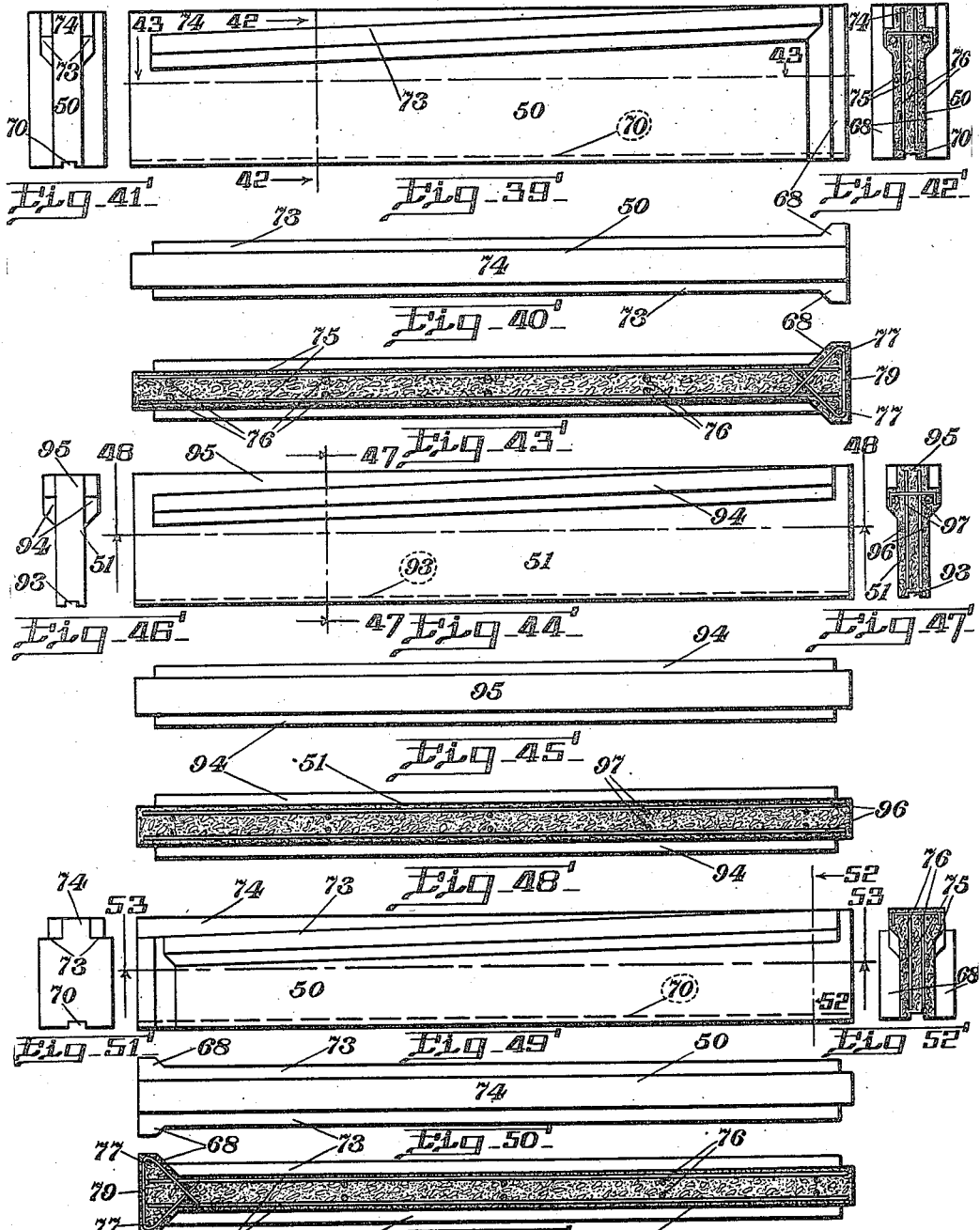

J. E. CONZELMAN.
ELEVATOR AND TANK CONSTRUCTION.
APPLICATION FILED OCT. 11, 1911.
1,045,522.
Patented Nov. 26, 1912.
17 SHEETS—SHEET 12.
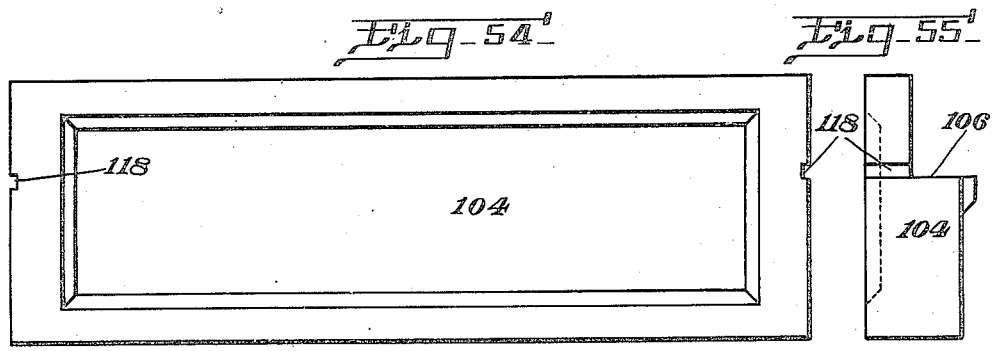
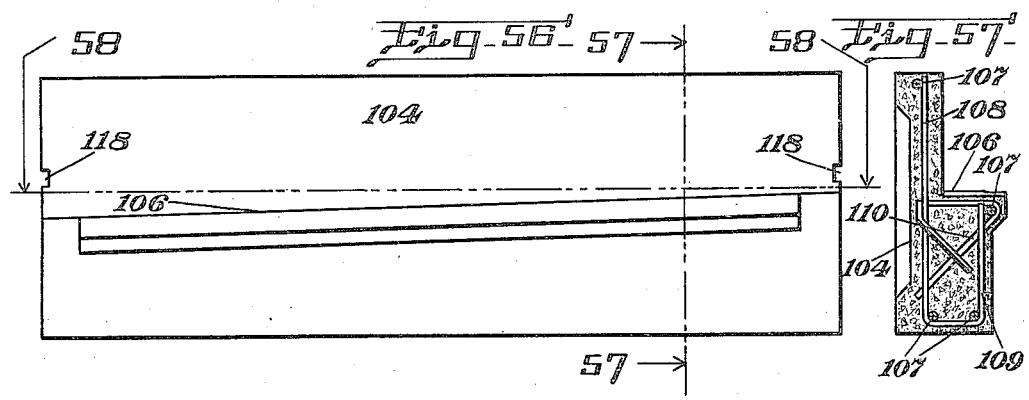
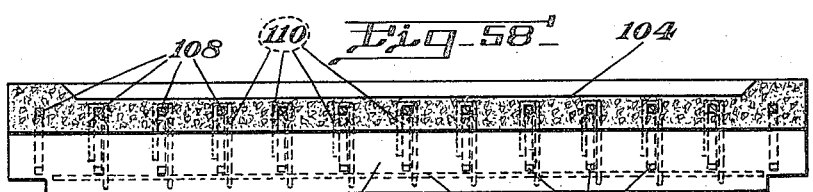
Witnesses:
Lottie M. Fox.
Bertha von Behrens.
Inventor:
John E. Conzelman,
By Hugh K. Wagner,
His Attorney.

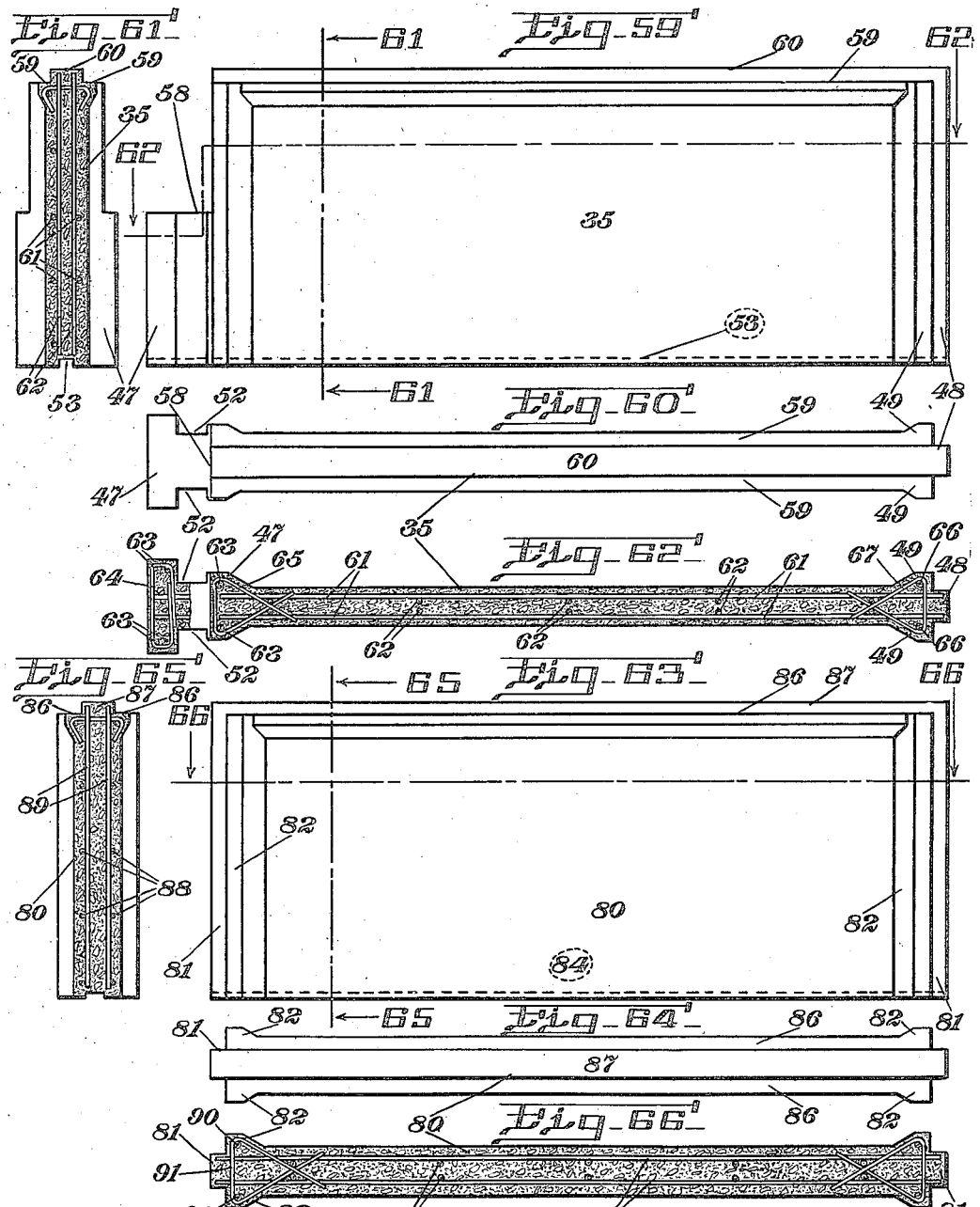

J. E. CONZELMAN.
ELEVATOR AND TANK CONSTRUCTION.
APPLICATION FILED OCT. 11, 1911.
1,045,522.
Patented Nov. 26, 1912.
17 SHEETS—SHEET 14.
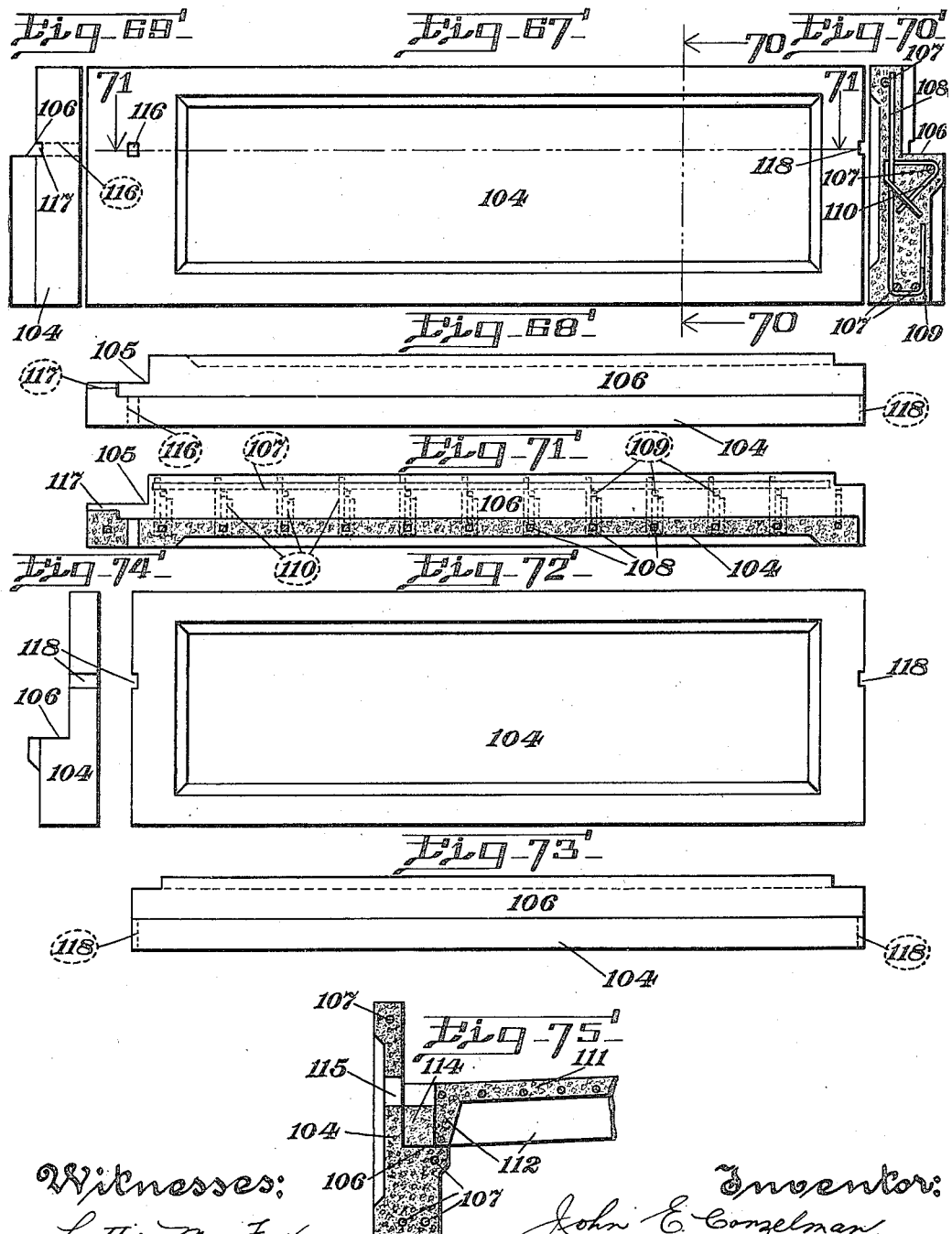

J. E. CONZELMAN.
ELEVATOR AND TANK CONSTRUCTION.
APPLICATION FILED OCT. 11, 1911.
1,045,522. Patented Nov. 26, 1912.
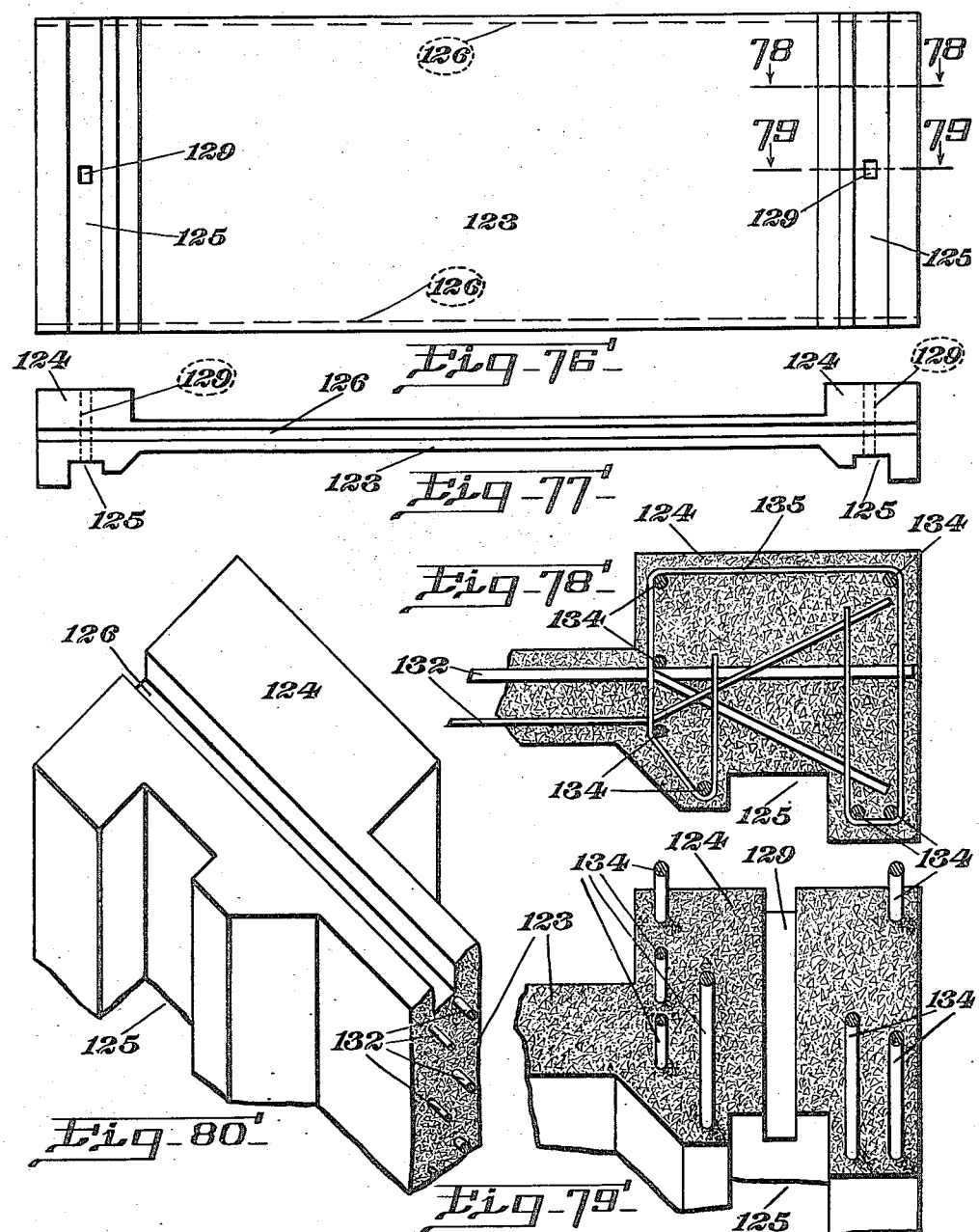

J. E. CONZELMAN.
ELEVATOR AND TANK CONSTRUCTION.
APPLICATION FILED OCT. 11, 1911.
1,045,522.
Patented Nov. 26, 1912.
17 SHEETS—SHEET 16.
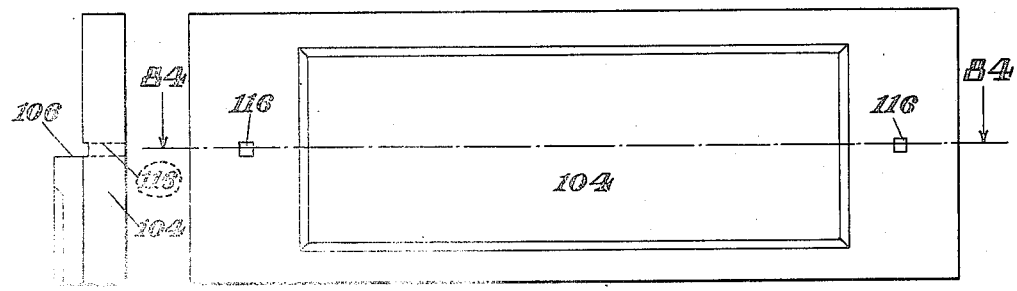
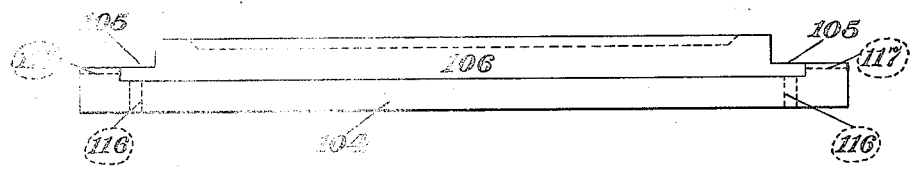
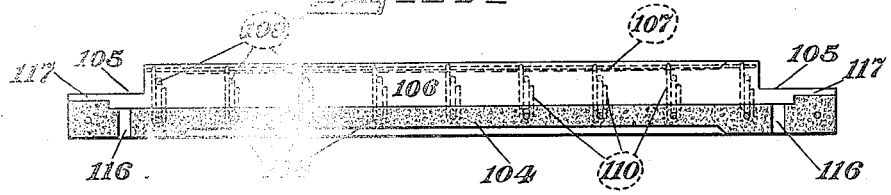
Witnesses:
Lottie M. Fox
Bertha von Behr
Inventor:
John E. Conzelman,
By Hugh K. Wagner,
His Attorney.

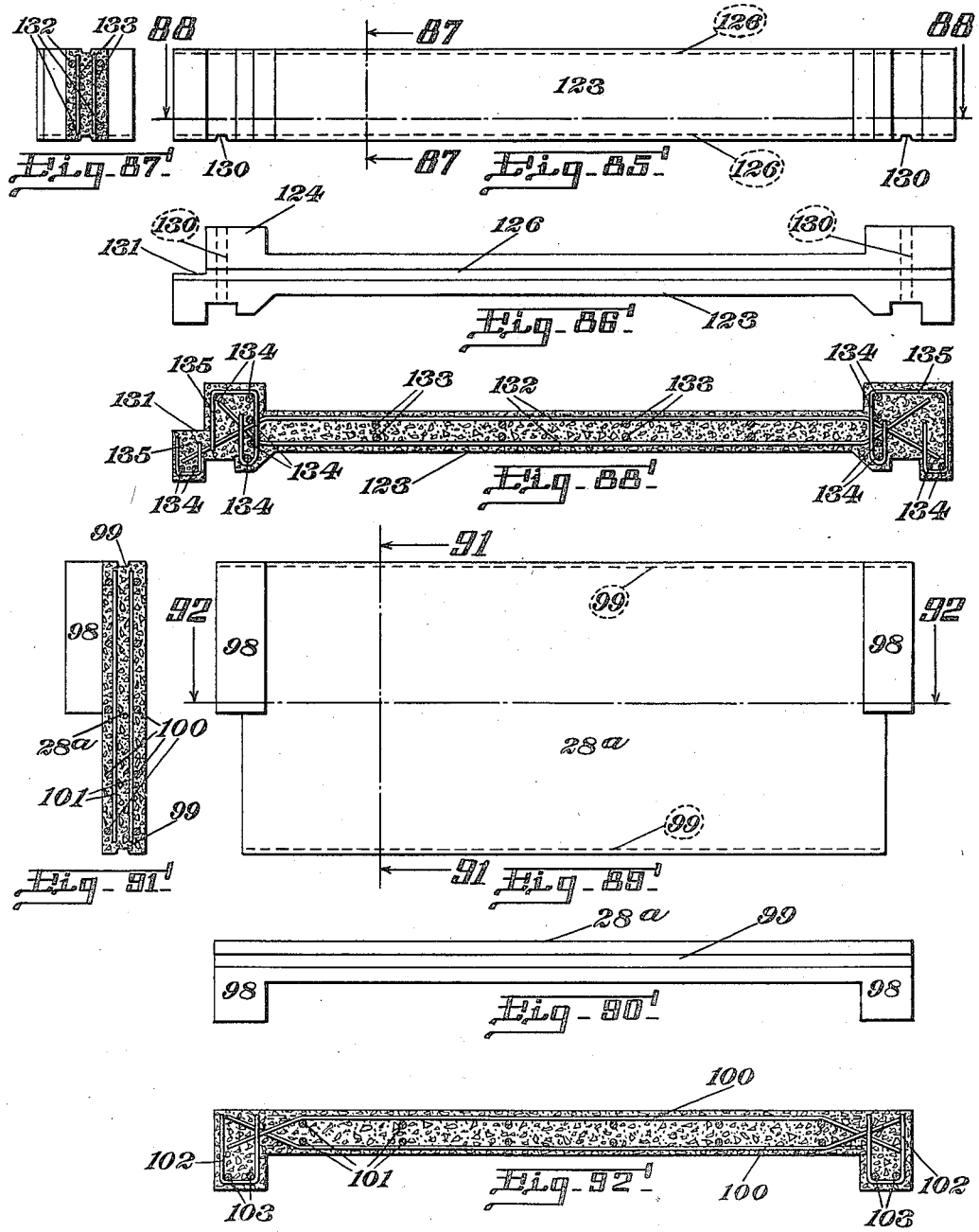

UNITED STATES PATENT OFFICE.

JOHN E. CONZELMAN, OF ST. LOUIS, MISSOURI, ASSIGNOR TO UNIT CONSTRUCTION COMPANY, OF ST. LOUIS, MISSOURI, A CORPORATION OF DELAWARE.

ELEVATOR AND TANK CONSTRUCTION.

1,045,522.                     Specification of Letters Patent.       Patented Nov. 26, 1912.

Application filed October 11, 1911. Serial No. 654,143.

*To all whom it may concern:*

Be it known that I, JOHN E. CONZELMAN, a citizen of the United States, residing at the city of St. Louis, State of Missouri, have invented certain new and useful Improvements in Elevator and Tank Construction, of which the following is a specification.

This invention relates to concrete structures and has particular reference to a construction in which concrete slabs are used for the walls of a grain-elevator, tank, and the like.

It is an object of this invention to provide a structure of concrete building elements, which coöperate and are interengaged to form rigid, secure, and lasting junctures of said elements.

It is also an object to provide a concrete building structure in which the general construction of the coöperating elements is generally improved to present a neat appearance as well as to prove of strong and durable nature.

Further, this invention consists of the novel features of construction and arrangement of parts, as hereinafter more fully described and pointed out in the claims.

Figure 1:
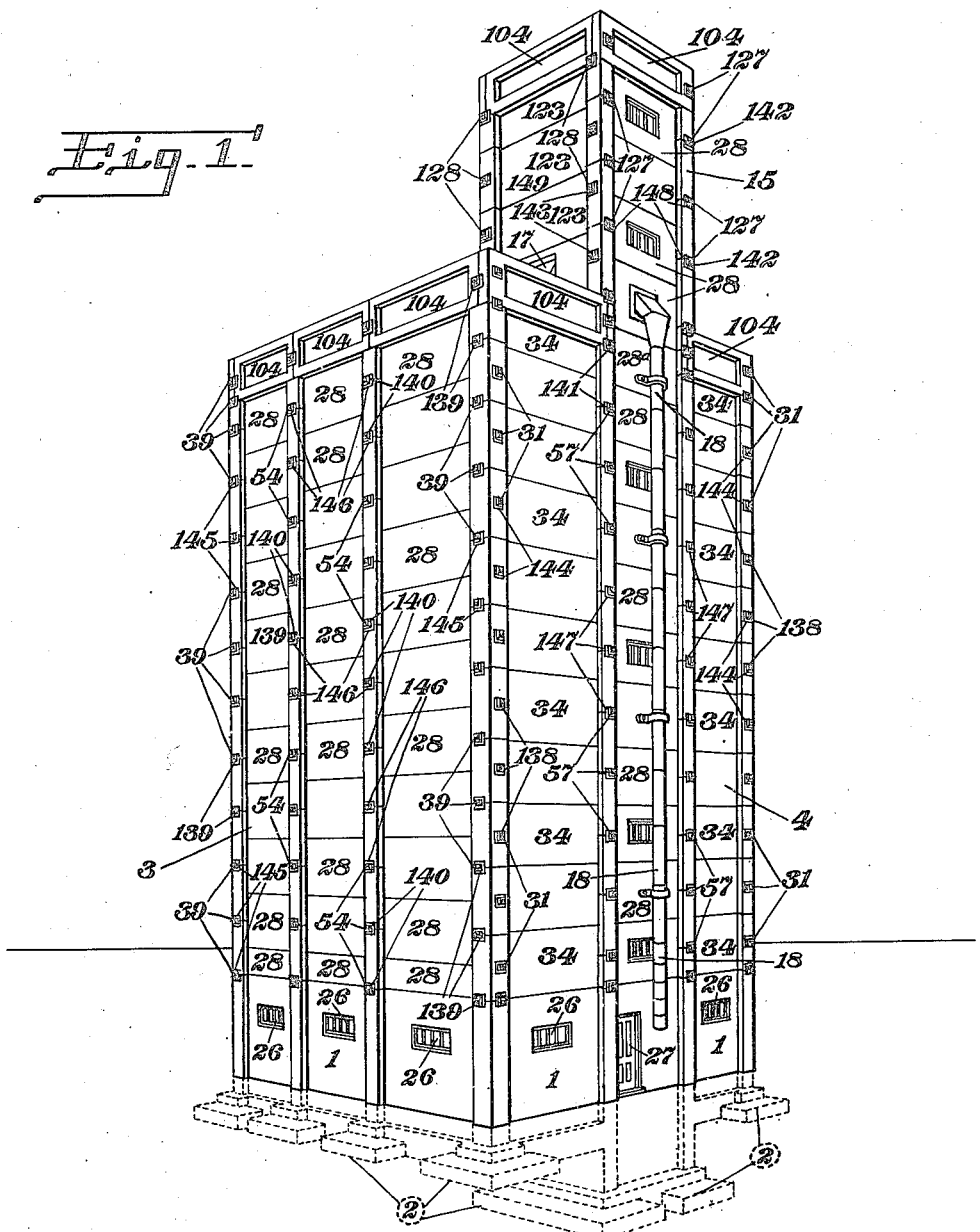
Figure 6:
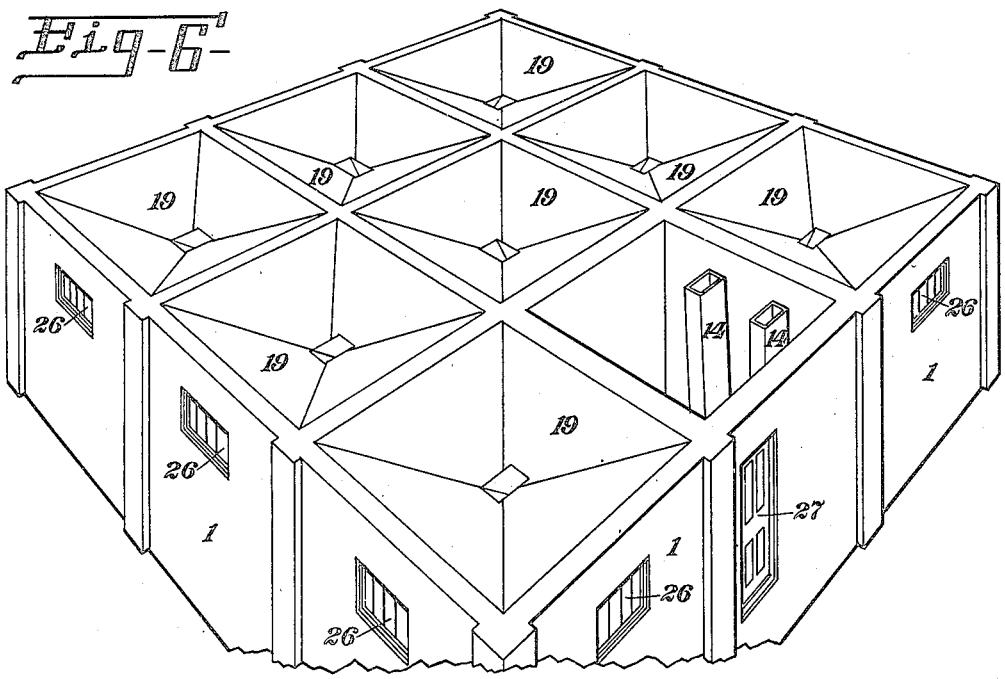
Figure 7:
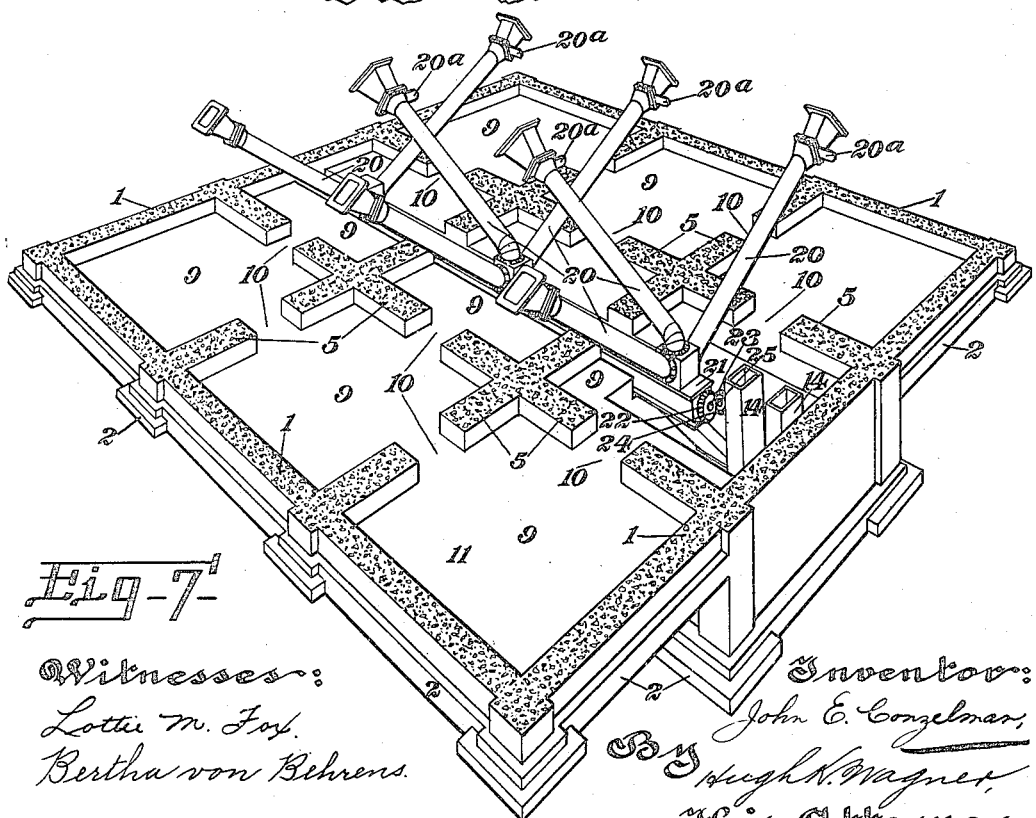

In the accompanying drawings forming part of this specification, in which like numbers of reference denote like parts wherever they occur, Figure 1 is a perspective view of an elevator embodying this invention; Fig. 2 is a plan view of the same; Fig. 3 is a fragmentary perspective view of the upper part of the elevator; Fig. 4 is a fragmentary perspective view of the lower part of the elevator; Fig. 5 is a perspective view of the roof; Fig. 6 is a perspective view of the upper part of the foundation; Fig 7 is a perspective view of the lower part of the foundation; Fig. 8 is a side elevation of an inner wall slab; Fig. 9 is an end elevation of same; Fig. 10 is a sectional view on the line 10—10, Fig. 8; Fig. 11 is a sectional view on the line 11—11, Fig. 8; Fig. 12 is a side elevation of an outer wall slab; Fig. 13 is an end elevation of same; Fig. 14 is a sectional view on the line 14—14, Fig. 12; Fig. 15 is a sectional view on the line 15—15, Fig. 12; Fig. 16 is a side elevation of an inner wall slab; Fig. 17 is a bottom plan view of same; Fig. 18 is a sectional view on the line 18—18, Fig. 16; Fig. 19 is a sectional view on the line 19—19, Fig. 16; Fig. 20 is a sectional view, on an enlarged scale, on the line 20—20, Fig. 16; Fig. 21 is a side elevation of a bottom slab of an inner wall; Fig. 22 is a bottom plan view of same; Fig. 23 is a sectional view on the line 23—23, Fig. 21; Fig. 24 is a side elevation of an outer wall slab; Fig. 25 is a top plan view of same; Fig. 26 is a sectional view on the line 26—26, Fig. 24; Fig. 27 is a sectional view, on an enlarged scale, on the line 27—27, Fig. 24; Fig. 28 is a side elevation of a top slab for an outer wall; Fig. 29 is a top plan view of same; Fig. 30 is a sectional view on the line 30—30, Fig. 28; Fig. 31 is a side elevation of an inner wall slab; Fig. 32 is a bottom plan view of same; Fig. 33 is a sectional view on the line 33—33, Fig. 31; Fig. 34 is a sectional view, on an enlarged scale, on the line 34—34, Fig. 31; Fig. 35 is a side elevation of an inner wall slab; Fig. 36 is a bottom plan view of same; Fig. 37 is a sectional view on the line 37—37, Fig. 35; Fig. 38 is a sectional view, on an enlarged scale, on the line 38—38, Fig. 35; Fig. 39 is a side elevation of a top slab for an inner wall; Fig. 40 is a top plan view of same; Fig. 41 is an end elevation of same; Fig. 42 is a sectional view on the line 42—42, Fig. 39; Fig. 43 is a sectional view on the line 43—43, Fig. 39; Fig. 44 is a side elevation of a top slab for an inner wall; Fig. 45 is a top plan view of same; Fig. 46 is an end elevation of same; Fig. 47 is a sectional view on the line 47—47, Fig. 44; Fig. 48 is a sectional view on the line 48—48, Fig. 44; Fig. 49 is a side elevation of a top slab for an inner wall; Fig. 50 is a top plan view of same; Fig. 51 is an end elevation of same; Fig. 52 is a sectional view on the line 52—52, Fig. 49; Fig. 53 is a sectional view on the line 53—53, Fig. 49; Fig. 54 is a side elevation of a cornice slab, showing the outer face of same; Fig. 55 is an end elevation of same; Fig. 56 is a side elevation of same, showing the inner face thereof; Fig. 57 is a sectional view on the line 57—57, Fig. 56; Fig. 58 is a sectional view on the line 58—58, Fig. 56; Fig. 59 is a side elevation of a top slab for an inner wall; Fig. 60 is a top plan view of same; Fig. 61 is a sectional view on the line 61—61, Fig. 59; Fig. 62 is a sectional view on the line 62—62, Fig. 59; Fig. 63 is a side elevation of a top slab for an inner wall; Fig. 64 is a top plan view of same;

Fig. 65 is a sectional view on the line 65—65, Fig. 63; Fig. 66 is a sectional view on the line 66—66, Fig. 63; Fig. 67 is a side elevation of a cornice slab; Fig. 68 is a top plan view of same; Fig. 69 is an end elevation of same; Fig. 70 is a sectional view on the line 70—70, Fig. 67; Fig. 71 is a sectional view on the line 71—71, Fig. 67; Fig. 72 is a side elevation of a cornice slab; Fig. 73 is a top plan view of same; Fig. 74 is an end elevation of same; Fig. 75 is a sectional view, on an enlarged scale, on the line 75—75, Fig. 5; Fig. 76 is a side elevation of a wall slab for the elevator tower; Fig. 77 is a top plan view of same; Fig. 78 is a sectional view, on an enlarged scale, on the line 78—78, Fig. 76; Fig. 79 is a sectional view, on an enlarged scale, on the line 79—79, Fig. 76; Fig. 80 is a fragmentary perspective view of an upper corner of same; Fig. 81 is a side elevation of a cornice slab for the tower; Fig. 82 is an end elevation of same; Fig. 83 is a top elevation of same; Fig. 84 is a sectional view on the line 84—84, Fig. 81; Fig. 85 is a side elevation of a wall slab for the lower part of the elevator tower; Fig. 86 is a top plan view of same; Fig. 87 is a sectional view on the line 87—87, Fig. 85; Fig. 88 is a sectional view on the line 88—88, Fig. 85; Fig. 89 is a side elevation of a special slab for the junction of the tower with a panel of an outer wall; Fig. 90 is a top plan view of same; Fig. 91 is a sectional view on the line 91—91, Fig. 89; and Fig. 92 is a sectional view on the line 92—92, Fig. 89.

Usually a grain-elevator, tank, or the like, is built circular in form, but, in doing so, a wasted area of ground is left in the corners of the piece of ground on which same is built. It is for this reason that the elevator hereinafter described is preferably built quadrangular in shape, as illustrated in the drawings, which results not only in obviating this wasted area of ground, but, also, in a saving in the total area in the piece of ground necessary for same.

The outer walls of the elevator are supported on monolithic foundation walls 1, which are supported on suitable footings 2, and are designated as walls 3, 3, and walls 4, 4, said walls 3, 3, being preferably disposed at substantially a right-angle to the walls 4, 4. The inner walls of the elevator are supported on division walls 5, which are formed integrally with the foundation walls 1, and are designated as walls 6, 6 and walls 7, 7, said walls 6, 6 being preferably disposed substantially parallel to walls 3, 3, and, also, at substantially a right-angle to walls 7, 7 and walls 4, 4. The walls 6, 6 and 7, 7 divide the elevator into a plurality of bins or rooms 8 in which the grain is stored. The division walls 5 divide the foundation into as many rooms 9 as there are bins 8 in the elevator, and each wall 5 contains an opening or doorway 10 to afford a passage from one room 9 to another, said rooms 9 being located underneath the bins 8, respectively. A monolithic floor 11 for the rooms 9 is formed integrally with the foundation walls 1 and, also, with the division wall 5. The receiver 12 of a grain-elevating machine of any ordinary construction is located in one of the rooms 9 and generally in a middle room 9 adjacent a foundation wall 1, and bears a chute or spout 13 through which the grain is fed into said receiver by gravity or other suitable means. The casing 14 of the grain-elevating machine extends upwardly through the bin 8 thereabove and projects into the interior of a tower 15 above said bin. A movable spout or chute 16 at the top of the casing 14 is adapted either to discharge the grain into the several spouts 17 separately that are arranged to discharge the grain into the other bins 8 at the tops thereof, or to discharge the grain into a spout or chute 18, which is arranged to discharge the grain into a conveyance or receptacle (not shown in the drawings) on the outside of the elevator. With the exception of the bin 8 in which the grain-elevating machine is located, each of the other bins 8 is provided with a monolithic hopper bottom 19, which is preferably formed integrally with the division walls 5 and, also, with the foundation wall or walls 1 adjacent thereto. Each hopper bottom 19 is provided with a discharge spout 20 having a valve 20ᵃ of any suitable construction said spout 20 being arranged to discharge the grain from its bin 8 into a trough 21 that is arranged to discharge the grain into the receiver 12. The grain that enters the trough 21 is conducted therethrough to the receiver 12 by means of an Archimedean screw, or the like (not shown). A gear 22 on the shaft 23 of the Archimedean screw is driven by a gear 24 on shaft 25, which receives its power from any suitable source. The grain that enters the receiver 12 is raised in the usual manner to the discharge spout 16, in order to discharge same either into a spout 17 that leads to a bin 8, or into the spout 18 that discharges same into a conveyance on the outside of the elevator. By means of the Archimedean screw in the trough 21, the grain that is allowed to discharge into said trough from a bin 8 can be fed into the receiver 12, so that same can be raised to the discharge spout 16, when it is desired either to turn the grain over in said bin, in order to prevent same from sprouting, or to change the grain from one bin to another, or to load the grain in said bin in a conveyance or conveyances on the outside of the elevator. For the purpose of ventilation and light, windows 26 are located in openings in the foundation walls 1, and a door 27 is located in an opening in one of said walls 1, in order to afford an access to the room 9 in which the grain-elevating machine is located.

The walls 3, 4, 6, and 7 are composed of a plurality of panels that constitute the walls of the bins 8. When the elevator contains nine bins 8, each of the walls 3, 4, 6, and 7 is composed of three panels, as best seen in Fig. 2. Each panel of said wall 3 consists of a plurality of vertically-disposed slabs 28, which are supported one on top of another and are held in place, in the manner hereinafter described. Each slab 28 is preferably molded with a rectangular configuration and, also, with a uniform thickness throughout, as depicted in detail in Figs. 12 to 15, inclusive. Each end of slab 28 contains a groove 29 for the reception of grout or similar cement mixture, and the top and bottom of said slab contains grooves 30 for the reception of grout and also, to allow tie-rods 31 to extend therethrough, as hereinafter described. The bottom slab 28 rests on a foundation wall 1, and a tie-rod 31 extends through the groove 30 in the bottom of same, said slab being preferably formed with approximately one-half the height of any one of the other slabs 28. The bottom of said bottom slab is "buttered" with a thin layer of grout just previous to the placing of same on the foundation wall 1, so that, when said grout sets, same unites the bottom slab 28 and said foundation wall 1 integrally together and holds said tie-rod in place in said groove. When the slabs 28 are placed one on top of another, in order to form a panel of wall 3, the grooves 30 in the adjoining edges of each two adjacent slabs 28 register with each other, so as to allow a tie-rod 31 to extend therethrough. Grout is applied to the adjoining edges of each two adjacent slabs 28, and, when said grout sets, same unites said slabs 28 integrally together and holds the tie-rods 31 firmly in place. Each tie-rod 31 is preferably longer than the wall 3, and the slabs 28 in each panel of wall 3 are arranged so as to allow the tie-rods 31 to extend between two adjacent slabs 28 of each panel of said wall. As an additional strengthening means, reinforcing bars 32 are embedded in slab 28 and are arranged to extend longitudinally thereof, some of said bars being located near the outer surface of said slab, and others being located near the inner surface thereof. The majority of the bars 32 are preferably located near the outer surface of slab 28, in order to prevent the pressure of the grain against the inner surface thereof from causing said slab to bulge outwardly, and adjacent the ends thereof, said bars turn toward the inner surface of said slab. Bars 33 are, also, embedded in slab 28 and are arranged to extend transversely of the bars 32, some of said bars 33 being located near the outer surface of said slab and others being located near the inner surface thereof.

The slabs 28 in the end panels of wall 3 are held in place by a plurality of vertically-disposed slabs 34 that constitute the end panels of walls 4 and, also, by a plurality of vertically-disposed slabs 35 that constitute the end panels of walls 7, and the slabs 28 in the middle panel of wall 3 are held in place by said slabs 35, as hereinafter described. Each slab 34 is preferably formed with a rectangular configuration and is provided with a post 36, or the like, that is formed integrally with one end thereof, as depicted in detail in Figs. 24 to 27, inclusive. Said post 36 has a groove 37 extending longitudinally in one side thereof and, when the slabs 34 are placed one on top of another to form an end panel of a wall 4, the posts 36 of each slab 34 register in vertical alinement and give the elevator the appearance of having a column at the corner thereof, and the grooves 37 in said posts, also, register in vertical alinement, in order to allow the ends of each slab 28 in an end panel of a wall 3 to fit therein, said ends of said slabs 28 being "buttered" with a thin layer of grout just previous to the insertion of same into said grooves 37, so that, when said grout sets, said slabs 28 and slabs 34 are thereby united integrally. A groove 38 extends longitudinally in the top of slab 34 and another in the bottom of said slab, in order to allow tie-rods 39 to extend therethrough and, also, for the reception of grout, being arranged to extend across the end of post 36.

Each groove 38 has an indentation 40 in one of its walls, said indentation being preferably located in the part of said groove that extends across an end of post 36. When the slabs 34 are placed one on top of another to form an end panel of wall 4, the grooves 38 in the adjoining edges of each two adjacent slabs register with each other, in order to allow a tie-rod 39 to extend therethrough, and the indentations 40, also, register with each other, grout being applied to the adjoining edges of each two adjacent slabs 34 just previous to the placing of one on top of the other. Said grout fills the space around the tie-rod 39 in the grooves 38 in the adjoining edges of said slabs and, also, fills the indentations 40 in the walls of said grooves, and, when said grout sets, same unites said slabs integrally together and holds said rod firmly in place in said grooves. The grout that enters the indentations 40, sets therein and forms a grout key, which not only locks said slabs firmly together, but prevents same from moving longitudinally. The bottom slab 34 rests on a foundation wall 1, and a tie-rod 39 extends through the groove 38 in the bottom of same, the bottom of said slab 34 being "buttered" with a thin layer of grout, which sets integrally with said slab and said foundation and, also, holds said tie-rod 39 in place in said groove. Another tie-rod 39 is placed in the groove 38 in the top of the bottom slab 34 and the next slab 34 is placed in position on said bottom slab, and, so on, until the panel is completed, a tie-rod 39 being placed between each two adjacent slabs and the adjoining edges of each two adjacent slabs being "buttered" with grout, which sets and thereby unites said slabs integrally. The slabs 34 are arranged so that their junctions are approximately half way between the junctions of the slabs 28 in the end panel of a wall 3 adjacent thereto, and, with the exception of the top slab 34, each of the other slabs 34 is provided with an opening 41, which extends transversely through its post 36. The openings 41 in each slab 34 register with the junctions of slabs 28, in order to allow the tie-rods 31 to extend therethrough. The top slab 34 is formed with approximately one-half the height of any one of the other slabs 34, as depicted in detail in Figs. 28, 29, and 30, and, when said top slab is placed in position at the top of an end panel of wall 4, the upper edge of same registers in the same horizontal plane with the upper edges of each top slab 28 in a wall 3 adjacent thereto. The opening 41 is omitted entirely from the top slab 34 and a groove 42 is provided in the top of the post 36 borne by said slab 34, said groove 42 being preferably arranged to extend through the indentation 40 in the top of said post and, also, to extend at substantially a right-angle to said groove 38, in order to allow a tie-rod 31 that lies in the grooves 30 in the upper edges of each top slab 28 in the wall 4 adjacent thereto to extend therethrough. A tie-rod 39 lies in the grooves 38 in the tops of each top slab 34 in one of the walls 4, but, instead of a tie-rod 39 being placed in the grooves 38 in the tops of each top slab 34 in the other wall 4, same is omitted entirely, in order to allow the special slab 28ª to fit in place in the middle panel of said other wall 4, as hereinafter described.

Each slab 34 is provided with a plurality of reinforcing bars 43, which lie near the inner and the outer surfaces of said slab and extend longitudinally thereof, the majority of said bars being located near the outer surface of said slab, in order to prevent the pressure of the grain against the inner surface of said slab from causing said slab to bulge outwardly. The ends of each bar 43 extend into the post 36 borne by slab 34, and the ends of some of said bars near each surface of said slab are preferably bent so as to cross one another. Bars 44 extend transversely of the bars 43 in slab 34 and some of same are located near the outer surface of said slab and others near the inner surface thereof. Bars 45 are embedded in the post 36 and are arranged to extend longitudinally of same being located near the corners thereof, and a bar or bars 46 being embedded in said post and being bent so as to encircle all of said rods 45.

Each slab 35 is preferably molded with a rectangular configuration and is provided with a post 47, which is formed integrally with one end thereof, the other end of said slab having a tenon 48 extending transversely thereof, as depicted in detail in Figs. 31 to 34, inclusive. A flange or rib 49 is provided on each surface of slab 35 and is located near the tenon 48, being arranged to extend substantially parallel to said tenon. The flanges 49 of each slab 35 in an end panel of wall 7 hold the slabs 50 in the end panel of a wall 6 adjacent thereto in place and, also, hold the slabs 51 in the middle panel of said wall 6 in place, as hereinafter described. Each side of post 47 contains a groove 52 that extends longitudinally thereof and, when said slabs 35 are placed one on top of another to form an end panel of wall 7, the posts 47 of each slab 35 register in vertical alinement and the flanges 49, also, register in vertical alinement. The grooves 52 in each post 47 register in vertical alinement so as to allow the ends of each slab 28 in an end panel of a wall 3 adjacent thereto to fit in the grooves 52 in one side of said posts and, also, to allow the ends of each slab 28 in the middle panel of said wall 3 to fit in the grooves 52 in the other side of said posts. The posts 47 hold the slabs 28 in place and give the elevator the appearance of having pilasters in walls 3. The ends of each slab 28 are "buttered" with grout just previous to the insertion of same into the grooves 52 and, when said grout sets, the slabs 28 and slabs 35 are thereby united integrally. A groove 53 is provided in the top and bottom of each slab 35 and is arranged to extend longitudinally thereof, in order to allow a tie-rod 54 to extend therethrough. The bottom slab 35 rests on a division wall 5, and a tie-rod 54 extends through the groove 53 in the bottom of same, the bottom of said slab being "buttered" with grout, which sets integrally with said slab and said division wall and holds said tie-rod in place in said groove. Another tie-rod 54 is placed in the groove 53 in the top of the bottom slab and the next slab 35 is placed in position on said bottom slab, and, so on, until the panel is completed, a tie-rod 54 being placed between each two adjacent slabs, and the adjoining edges of each two adjacent slabs 35 being "buttered" with grout, which sets and thereby unites said slabs integrally. The slabs 35 are arranged so that their junctions are approximately half way between the junctions of the slabs 28 in the wall 3 adjacent thereto, and, with the exception of the top slab 35, each of the other slabs 35 is provided with an opening 55, which extends transversely through its post 47, and, also, with a notch 56, which is formed in tenon 48. The openings 55 in each slab 35 register with the junctions of slabs 28, in order to allow the tie-rods 31 to extend therethrough, and the notches 56 in each slab 35 register with the junctions of slabs 50 in the end panel of wall 6 adjacent thereto, in order to allow the tie-rod 57 that are located between said slabs 50 to extend therethrough. The top slab 35 is formed with approximately the same height as any one of the other slabs 35, as depicted in detail in Figs. 59 to 62, inclusive, and, when said top slab is placed in position at the top of an end panel of wall 7, the top of same extends higher than the tops of each top slab 28 in a wall 3 adjacent thereto. The post 47 borne by the top slab 35 has a cut-away part 58 in the upper portion thereof, so that, when said slab is placed in position, as just described, the top of the lower part of said posts 47 registers in the same horizontal plane with the tops of each top slab 28 in said wall 3. A shoulder 59 is provided on each side of the top slab 35 and is arranged to extend longitudinally thereof, being located adjacent a tenon 60 on the top of said slab. The tie-rod 31 that is located in the grooves 30 in the upper edges of the top slabs 28 extends across the top of the post 47 borne by the top slab 35 of wall 7. Reinforcing bars 61 are embedded in slab 35 and are arranged to extend longitudinally thereof, some being located near one surface of said slab and others near the other surface of same. Some of the bars 61 near each surface of slab 35 have their ends that project into post 47 bent, so as to cross one another within said post, and, also, have their ends that project into tenon 48 bent so as to cross one another near said tenon. Bars 62 extend transversely of the bars 61 in slab 35 and some of same are located near one surface of said slab, while others are located near the other surface thereof. Bars 63 are embedded in the post 47 and are arranged to extend longitudinally thereof, being located near the corners of same, a bar or bars 64 being embedded in said post and bent so as to encircle the bars 63 that are located near the outer corners of said post, and a bar or bars 65, also, embedded in said slab being bent so as to encircle the bars 63 that are located near the inner corners of said post and, also, to have the ends thereof crossing one another within said slab. Bars 66 are embedded in the flanges or ribs 49 and are arranged to extend longitudinally thereof, a bar or bars 67 being embedded in said slab and bent so as to encircle all of said bars 66 and having the ends thereof crossed within said slab.

The middle panel of each wall 4 is composed of a plurality of slabs 28 that are supported one on top of another, as hereinabove described. The slabs 28 in the middle panel of said wall 4 are arranged, so that their junctions register in the same horizontal planes with the junctions of slabs 34 in the end panels of said wall, in order to allow the tie-rods 39 that are located between said slabs 34 to extend between said slabs 28, each of said tie-rods 39 being preferably longer than said wall. The adjoining edges of each two adjacent slabs 28 are "buttered" with grout so that, when same sets, said slabs are thereby united integrally and the tie-rods 39 are held in place. The top slab 28 of the middle panel of one wall 4 is preferably formed with approximately one-half the height of any one of the other slabs 28, so that its upper edge registers in the same horizontal plane with the upper edges of the top slabs 34 in each end panel of said wall 4, the tie-rod 39 that is located in the grooves 38 in the upper edges of said top slabs 34 being, also, located in the groove 30 in the upper edge of said top slab 28. The slab 28ª is placed at the top of the middle panel of the other wall 4 and is formed with such height that the top thereof extends higher than the upper edges of the top slabs 34 of the end panels of said wall, as hereinafter described. Said slabs 28 in the middle panel of each wall 4 and the slabs 34 in each end panel of said wall are held in place by the slabs 50 that constitute the end panels of each wall 6 adjacent thereto.

Each slab 50 is preferably molded with a rectangular configuration and is provided with a post 68, which is formed integrally with one end thereof, as depicted in detail in Figs. 16 to 20, inclusive. Each side of post 68 contains a groove 69 that extends longitudinally thereof, and, when a plurality of slabs 50 are placed one on top of another to form an end panel of a wall 6, the posts 68 of each slab 50 register in vertical alinement. The grooves 69 in said posts 68, also, register in vertical alinement, in order to allow the ends of each slab 28 in the middle panel of wall 4 to fit in the grooves 69 in one side of said posts and, also, to allow the ends of each slab 34 in an end panel of said wall 4 to fit in the grooves 69 in the other side of said posts. The posts 47 hold the slabs 28 and 34 in place and give the elevator the appearance of having pilasters in walls 3. The ends of each slab 28 in the middle panel of wall 4 and the ends of each slab 34 in an end panel of said wall are "buttered" with grout just previous to the insertion of same into the grooves 69 in posts 68, and, when said grout sets, the slabs 28, slabs 50, and slabs 34 are thereby united integrally. A groove 70 is provided in the top and bottom of slab 50 and is arranged to extend longitudinally thereof, in order to allow a tie-rod 57 to extend therethrough. The bottom slab 50 rests on a division wall 5, and a tie-rod 57 extends through the groove 70 in the bottom of same, the bottom of said slab being "buttered" with grout, which sets integrally with said slab and said division wall and holds said tie-rod in place in said groove. Another tie-rod 57 is placed in the groove 53 in the top of the bottom slab 50 and the next slab 50 is placed in position on said bottom slab, and, so on, until the panel is completed, a tie-rod 57 being placed between each two adjacent slabs, and the adjoining edges of each two adjacent slabs 50 being "buttered" with grout, which sets and thereby unites said slabs integrally. The slabs 50 are arranged so that their junctions are approximately half way between the junctions of slabs 34 in an end panel of wall 4 and, also, half way between the junctions of slabs 28 in the middle panel of said wall 4, and, with the exception of the top and the bottom slabs 50, each of the other slabs 50 is provided with an opening 71 that extends transversely through the post 68. The openings 71 in each of said slabs 50 register with the junctions of the slabs 34 in an end panel of wall 4 and, also, with the junctions of the slabs 28 in the middle panel of said wall, in order to allow the tie-rods 39 to extend therethrough.

The bottom slab 50 is formed with approximately one-half the height of any one of the other slabs 50, except the top slab 50, and is depicted in detail in Figs. 21 to 23, inclusive, and, instead of an opening 71 being formed in said bottom slab 50, same is omitted entirely and a groove 72 is formed in the bottom of post 68 borne by said slab, said groove being arranged to extend transversely of said post, in order to allow the bottom tie-rod 39 to extend therethrough. The upper edge of the slab 50 that supports the top slab 50 registers in the same plane with the upper edges of each top slab 34 and the upper edge of the top slab 28 in wall 4 adjacent thereto. The top slab 50 is somewhat shorter and relatively smaller in height than the slab 50 that supports same. The grooves 69 are omitted entirely from the post 68 borne by the top slab 50, and said post is formed relatively thinner than the post 68 on the slab 50 below same, so that, when the top slab 50 is placed in position, the face of the post 68 borne by said top slab 50 registers approximately in the same vertical plane with the inner surfaces of the slabs 34 and 28 in the wall 4 adjacent thereto. A shoulder 73 is provided on each side of the top slab 50 and is arranged to extend longitudinally thereof, being located adjacent a tenon 74 on the top of said slab and extending from the post 68 at one end of said slab to within a short distance of the other end of said slab. The shoulders 73 on the top slab 50 of one end panel of wall 6 slope downwardly from the post 68 on said slab, as depicted in detail in Figs. 39 to 43, inclusive, and the shoulders 73 on the top slab 50 of the other end panel of said wall 6 slope upwardly from the post 68 on same, as depicted in detail in Figs. 49 to 53, inclusive, all of said shoulders being inclined so as to register approximately in the same inclined plane.

Each slab 50 is provided with reinforcing bars 75, which are arranged to extend longitudinally thereof, some being located near one surface of said slab and others near the other surface thereof. Some of the bars 75 near each surface of said slab have their ends that extend into the post 68 borne by said slab bent so as to cross one another within said post. Bars 76 extend transversely of said bars 75 in slab 50 and some of said bars 76 are located near one surface of said slab and others near the other surface thereof. Bars 77 are embedded in the post 68 borne by said slab and are arranged to extend longitudinally of said post, being located near the corners of same, a bar or bars 78 being embedded in said post and bent so as to encircle bars 77 that are located near the outer corners of said post, and a bar or bars 79, also, embedded in said slab being bent, so as to encircle the bars 77 that are located near the inner corners of said post and, also, to have the ends thereof crossing one another within said slab.

The middle panel of each wall 7 is composed of a plurality of slabs 80 that are supported one on top of another. Each slab 80 is preferably molded with a rectangular configuration, as depicted in detail in Figs. 35 to 38, inclusive. Each end of slab 80 is provided with a tenon 81, and, adjacent said tenon, a flange 82 is provided on each side of said slab. When the slabs 80 are placed one on top of another to form the middle panel of a wall 7, the flanges 82 adjacent the ends of each of said slabs register in vertical alinement and the tenons 81 on the ends of each of said slabs, also, register in vertical alinement. The faces of tenons 81 on each slab 80 in the middle panel of wall 7 nearly touch the faces of the tenons 48 on each slab 35 in an end panel of said wall 7, and the flanges 82 on each slab 80 and the flanges 49 on each slab 35 form the walls of spaces 83 adjacent both sides of said tenons, in order to allow the ends of each slab 50 in an end panel of wall 6 adjacent thereto to fit in the space 83 on one side of said tenons, and the ends of each slab 51 in the middle panel of said wall 6 to fit in the space 83 on the other side of said tenons, and thereby hold said slabs 50 and 51 in place, the ends of said slabs 50 and 51 being "buttered" with grout just previous to the insertion of same into spaces 83, so that, when the grout sets, the slabs 35, 50, 51, and 80 are thereby united integrally. A groove 84 is provided in the top and bottom of each slab 80 and is arranged to extend longitudinally thereof, in order to allow a tie-rod 54 to extend therethrough. The bottom slab 80 rests on a division wall 5, and a tie-rod 54 extends through the groove 84 in the bottom of same, the bottom of said slab being "buttered" with grout, which sets integrally with said slab and said division wall and holds said tie-rod in place in said groove. The slabs 80 in the middle panel of said wall 4 are arranged so that their junctions register in the same horizontal planes with the junctions of slabs 35 in the end panels of said wall 4, in order to allow the tie-rods 54 that are located between the slabs 35 to extend between the slabs 80, each of said tie-rods 54 being preferably longer than said wall 7. The adjoining edges of each two adjacent slabs 80 are "buttered" with grout so that, when same sets, said slabs 80 are thereby united integrally and the tie-rods 54 are held in place therebetween.

The slabs 80 are arranged so that their junctions are approximately half way between the junctions of slabs 50 and, also, slabs 51 in the wall 6 adjacent thereto, and with the exception of the top slab 80, each of the other slabs 80 is provided with a notch 85 in each tenon 81 on the ends thereof. The notch 85 in the tenons 81 of each slab 80 registers with the junctions of slabs 50 and slabs 51 and, also, with notches 56 in the tenons 48 of each slab 35, in order to allow the tie-rods 57 that are located between slabs 50 and 51 to extend therethrough. The top slab 80 is formed with approximately the same height as any one of the other slabs 80, as depicted in detail in Figs. 63 to 66, inclusive, and, when said top slab is placed in position at the top of the middle panel of wall 7, the top of same registers in the same horizontal plane with the tops of each top slab 35 adjacent thereto in said wall 7, and the tenons 81 on the ends of said slab 80 nearly touch the tenons 48 on the ends of the top slab 35 in each end panel of wall 7. A shoulder 86 is provided on each side of the top slab 80 and is arranged to extend longitudinally thereof, being located adjacent a tenon 87 on the top of said slab and registering in the same horizontal plane with the shoulders 59 on each top slab 35 in said wall 7 and, also, being level with the ends of each shoulder 73 on the top slab 50 of an end panel of wall 6 adjacent thereto.

Reinforcing bars 88 are embedded in each slab 80 and are arranged to extend longitudinally thereof, some being located near one surface of said slab and others near the other surface thereof. Some of the bars 88 near each surface of slab 80 have their ends bent so as to cross one another near the flanges 82 at both ends of said slab, and the ends of the other bars 88 project into the tenons 81 at the ends of said slab. Bars 89 extend transversely of the bars 88 and some of same are located near one surface of said slab and others near the other surface thereof. Bars 90 are embedded in flanges 82 and are arranged to extend longitudinally thereof. The bars 90 in the flanges 82 at one end of the slab 80 are encircled by a bar or bars 91, and the bars 89 in the flanges 82 at the other end of said slab are, also, encircled by a bar or bars 90.

Each slab 51 in the middle panel of each wall 6 is preferably formed with the same configuration as slab 28, as depicted in detail in Figs. 8 to 11, inclusive, being provided with a groove 92 in each end thereof and, also, with a groove 93 in the top and bottom thereof. The slabs 51 in the middle panel of said wall 6 are arranged so that their junctions register in the same horizontal plane with the junctions of slabs 50 in the end panels of said wall, in order to allow the tie-rods 57 that are located between said slabs 50 to extend between said slabs 51, each of said tie-rods 57 being preferably longer than the wall 6. The bottom slab 51 rests on a division wall 5, and a tie-rod 57 extends through the groove 92 in the bottom of same, the bottom of said slab being "buttered" with grout, which sets integrally with said slab and said division wall and holds said tie-rod in place in said groove. Another tie-rod 57 is placed in the groove 93 in the top of the bottom slab 51 and the next slab 51 is placed in position on said bottom slab, and, so on, until the panel is completed, a tie-rod 57 being placed between the adjoining edges of each two adjacent slabs 51 being "buttered" with grout, which sets and thereby unites said slabs integrally. The bottom slab 51 is formed with approximately one-half the height of any one of the other slabs 51, except the top slab 51. The top slab 51 is relatively smaller in height than the slab 51 that supports same. A shoulder 94 is provided on each side of the top slab 51 and is arranged to extend longitudinally thereof, being located adjacent a tenon 95 on the top of said slab and terminating within a short distance of each end of said slab. The shoulders 94 on the top slab 51 slope downwardly from one end of the slab to the other end thereof, as depicted in detail in Figs. 44 to 48, inclusive, and register in the same inclined plane with the shoulders 73 on the top slabs 50 of each end panel of wall 7. Each end of the top slab 51 fits in a space 83 between flanges 49 and 82 on the top slabs 35 and 80, respectively, in the wall 7 adjacent thereto and the ends of the shoulders 94 on said slab 51 abut the sides of the shoulders 59 and 86 on said slabs 35 and 80, respectively, so that the top surfaces of said shoulders 94 are flush with the top surfaces of said shoulders 59 and 86. Reinforcing bars 96 are embedded in each slab 51 and are arranged to extend longitudinally thereof, some being located near one surface of said slab and others near the other surface thereof. Some of said bars 96 near each surface of the slab 51 have their ends bent so as to cross one another near each end of said slab. Bars 97 extend transversely of bars 96 and some of same are located near one surface of said slab and others near the other surface thereof.

The ends of the slab 28ª fit in the grooves 52 in the posts 47 of each slab 35 adjacent thereto and the top of said slab 28ª registers in the same horizontal plane with the upper edges of each top slab 50 adjacent thereto. Each end of said slab 28ª is provided with a post 98. Said post 98 extends vertically above the post 47 on the slab 35 adjacent thereto and rests on the top of said post 47, being formed with approximately one-half the width of said post 47. A groove 99 is provided in the top and bottom of slab 28ª, as depicted in detail in Figs. 89 to 92, inclusive, in order to allow tie-rods 31 to extend therethrough. Reinforcing bars 100 extend longitudinally in slab 28ª, some being located near one surface of said slab and others near the other surface of said slab. Some of the bars 100 adjacent each surface of the slab 28ª have their ends bent so as to cross one another adjacent the ends of said slab. Bars 101 lie near both surface of slab 28ª and extend vertically in same. Each post 98 has a U-shaped bar or bars 102 embedded therein and, also, a bar or bars 103 extending vertically through said U-shaped bar or bars.

The top slabs 28 and 34 of the panels of the walls 3 and 4, except the middle panel of wall 4 in which the slab 28ª is located, support a corresponding number of slabs 104 that constitute the cornice of the elevator, as best seen in Figs. 1, 3, and 5, said slabs 104 being depicted in detail in Figs. 54 to 58, and Figs. 67 to 74, inclusive. Each slab 104 is preferably molded with a rectangular configuration and may have its outer face paneled, if so desired. The end slabs 104 above each wall 3 rest on the top slabs 28 of the end panels of said wall and the middle slab 104 above said wall rests on the top slab 28 the middle panel thereof. Each end slab 104 has one end thereof resting on approximately one-half of the top of post 36 on the upper slab 34 adjacent thereto, and the other end thereof fitting in the cut-away part 58 of the post 47 on the upper slab 35 adjacent thereto and resting on approximately one-half of the top of the lower part of said post 47. The ends of the middle slab 104 fit in the cut-away parts 58 of the posts 47 on the upper slabs 35 adjacent thereto and rest on the tops of the lower parts of said posts, so as to abut the ends of each end slab 104 above wall 3. The end slabs 104 above each wall 4 rest on the top slabs 34 of the end panels of said wall and a middle slab 104 rests on the top slab 28 of the middle panel of one of said walls 4. Each end slab 104 above wall 4 has one end thereof resting on approximately one-half of the top of post 68 on the first slab 50 underneath the top slab 50 and the other end thereof being supported on the top of post 36 on the upper slab 34 and having a cut-away part 105, as best seen in Fig. 72, to allow the end of an end slab 104 above an end panel of wall 3 adjacent thereto to fit therein. The ends of the middle slab 104 above one of the walls 4 rest on the tops of the posts 78 on the slab 50 underneath the top slabs 50 so as to abut the ends of each end slab 104 borne by said wall 4. The slabs 104 that are supported on the top slabs 34 of the end panels of the wall 4 in which the slab 28ª is located are arranged so that their ends, which rest on the tops of the posts 68 on the slabs 50 underneath the top slabs 50, abut the sides of the posts 98 on said slab 28ª and the tops of said slabs 104 extend higher than the tops of said posts 98. Each slab 104 is provided with a shoulder 106, which projects from the inner face thereof. The shoulder 106 on each slab 104 above walls 3 slope downwardly from one end thereof to the other and terminate within a short distance of each end of said slab, as best seen in Fig. 56. The shoulders 106 on the slabs 104 above each wall 4 are arranged to register in substantially the same inclined plane with the shoulders 73 and 94 on the upper slabs 50 and 51, respectively, so as to be flush with the shoulders 59 and 86 on the upper slabs 35 and 80, respectively, and, also, with shoulders 106 on the slabs 104 above walls 4, said shoulders 106 on the slabs 104 above walls 4 being arranged to extend substantially horizontal. As additional strengthening means, reinforcing bars 107 are embedded in each slab 104 and are arranged to extend longitudinally thereof. Bars 108 extending vertically in slab 104 have their lower ends bent upwardly to form stirrups 109 in the lower part of said slab, in order to allow the bars 108 that are located in the lower part of said slab to extend through said stirrups. One of the bars 107 is located in the shoulder 106 and is encircled by bars 110, which are bent so as to encircle the bars 108.

The roof of the elevator consists of a plurality of slabs 111 that rest on the shoulders 59, 73, 86, and 94 on the upper slabs 35, 50, 80, and 51, respectively, and, also, on shoulders 106 on the cornice slabs 104. Flanges 112 are provided on the under side of each slab 110 and are the particular parts of said slabs that rest on the shoulders 59, 73, 86, 94, and 106 on said slabs 35, 50, 80, 51, and 104. The flanges 112 raise the top surfaces of slabs 110 higher than the tops of tenons 60, 74, 87, and 95 on the upper slabs 35, 50, 80, and 51, respectively, so as to leave spaces 113 above said tenons and between the edges of said slabs adjacent said tenons. Said spaces 113 are filled with grout, which, when set, unites the roof slabs 111 and the upper slabs 35, 50, 51, and 80 integrally, thus constituting a monolithic structure. Said roof slabs 111 are arranged so as to leave spaces 114 between the inner faces of the cornice slabs 104 and the edges of said roof slabs adjacent thereto. Said spaces 114 are, also, filled with grout, which, when set, unites said roof slabs and cornice slabs integrally. The grout in the space 114 adjacent the low side of the roof is arranged to slope downwardly from the middle to the ends thereof, in order to allow the water to drain from the roof into the openings 115 in the cornice slabs 104 adjacent the ends of said space, so as to afford a drain for the roof, said low side of the roof being adjacent the wall 4 that is opposite tower 15. A tie-rod 39 extends through the space 114 adjacent the low side of the roof and passes through openings 116 in end slabs 104 above each wall 3 adjacent thereto. Each space 114 adjacent the slabs 104 above each wall 3 has a tie-rod 31 extending longitudinally therethrough and passing through grooves 117 in the cut-away parts 105 of the end slabs 104 above wall 3 and, also, through grooves 118 in the ends of the end slabs 104 above each wall 4 adjacent thereto, said grooves 117 being arranged to register with the grooves 118. A tie-rod 54 extends through the space 114 above wall 7 and passes through grooves 118 in the ends of the middle and end slabs 104 above wall 3, and a tie-rod 57 extends through the space 114 above wall 6 and passes through grooves 118 in the ends of the middle and end slabs 104 above one wall 4 and, also, through a groove 118 in the end of the end slab 104 above the other wall 4. An opening 119 is provided in a slab 111 over each bin 8, in order to allow a spout 17 to discharge the grain therethrough into said bin, and an opening 120 is, also, provided in a slab 111 over each bin 8, in order to afford access to said bin, there being a removable cover 121 for said opening 117. Each bin 8 is provided with a ladder 122, which is secured to a wall thereof by any suitable means, said ladder being located beneath the opening 120 at the top of said bin and extending approximately the entire height of said bin.

The tower 15 comprises a front wall and a rear wall and two side walls. The front wall consists of a plurality of slabs 28 that rest one on top of another, the bottom slab 28 being supported on the slab 28ª and the adjoining edges of each two adjacent slabs being "buttered" with grout, which, when set, unites same integrally. The rear wall, also, consists of a plurality of slabs 28 that rest one on top of another, the bottom slab 28 being supported on the tenon 87 on the top of the upper slab 80 of the middle panel of wall 7 adjacent the bin 8 in which the elevating machine is located and the adjoining edges of each two adjacent slabs being "buttered" with grout, which, when set, unites said slabs integrally. Each side wall of said tower consists of a plurality of slabs 123 that are supported one on top of another, the bottom slab 123 being supported on the tenon 74 on top of the upper slab 50 of the end panel of wall 6 adjacent said bin and the adjoining edges of each two adjacent slabs being "buttered" with grout, which, when set, unites same integrally.

Each slab 123 is preferably molded with a rectangular configuration, as depicted in detail in Figs. 76 to 80 and Figs. 85 to 88, inclusive, and each end of said slab is provided with a post 124 that is formed integrally therewith. Each post 124 is provided with a groove 125, which extends longitudinally in one side thereof and when the slabs 123 are placed one on top of another to form a side wall of tower 15, the grooves 125 in each post 124 adjacent the front wall of said tower register in vertical alinement, so as to allow the ends of each slab 28 in the front wall of said tower to fit therein, and the grooves 125 in each post 124 adjacent the rear wall of said tower to register in vertical alinement, in order to allow the ends of each slab 28 in the rear wall of said tower to fit therein, the ends of said slabs 28 being "buttered" with grout just previous to the insertion of same into the grooves 125, so that, when said grout sets, said slabs 28 and 123 are thereby united integrally. A groove 126 extends longitudinally in the top of slab 123 and another in the bottom of said slab, in order to allow tie-rods 127 to extend therethrough. The slabs 28 join one another approximately half way between the junctions of slabs 123, and tie-rods 128 that lie in the grooves 30 in slabs 28 extend through openings 129 in posts 124. The tie-rod 19 that lies in the space 114 adjacent the slabs 104 on the wall 4 in which the slab 28ª is located extends through the groove 99 in the top of said slab 28ª and, also, through the groove 30 in the bottom of the lower slab 28 that rests on said slab 28ª, and the tie-rod 54 that is located in the space 113 over the wall 7 on which the rear wall of the tower rests extends through the groove 30 in the bottom of the lower slab 28 in the rear wall of said tower. The bottom slab 123 has a groove 130 extending transversely of the bottom of each post 124 borne thereby, so as to allow said tie-rod 39 to extend through the groove 130 in the post 124 on wall 7 and to allow said tie-rod 31 to extend through the groove 130 in the post 124 on the wall 4. Said bottom slab 123 is preferably formed with such height that, when same is placed in position on the top slab 50 of an end panel of a wall 7, the upper edge of said slab 123 registers substantially in the same plane with the top of the cornice slab 104 adjacent thereto. The end of said cornice slab 104 fits in a cut-away part 131 in the post 124 on the forward end of the bottom slab 123 and the remaining part of said post rests on the top of the post 98 on slab 28ᵃ. The faces of the posts 124 on the forward end of the slabs 123 register in the same vertical plane with the faces of posts 68 underneath same. The tops of the upper slabs 123 and 28 register in substantially the same horizontal plane. Each wall of the tower 15 supports a cornice slab 104. The cornice slabs 104 on the front and rear walls of the tower 15 have cut-away parts 105 in the ends thereof, in order to allow the ends of the cornice slabs 104 on the side walls of said tower to fit therein. Roof slabs 111 rest on shoulders 106 on the inner faces of slabs 104, as hereinabove described, so as to leave spaces 114 between the edges of said slabs 111 and 104, said spaces being filled with grout, which, when set, unites said slabs 104 and 111 integrally. Tie-rods 127 extend through the spaces 114 adjacent the slabs 104 on the side walls of tower 15 and pass through openings 116 in the slabs 104 on the front and rear walls of said tower, and tie-rods 128 that lie in the spaces 114 adjacent the slabs 104 on the front and rear walls of said tower extend through grooves 118 in the ends of the slabs 104 on the side walls of said tower and, also, through grooves 117 in the cut-away parts 105 of the slabs 104 on the front and rear walls of said tower. The shoulders 106 on the slabs 104 that rest on the side walls of the tower slope downwardly from the front wall to the rear wall of said tower, in order to allow the water to drain from the roof of said tower into an opening 115 in the slab 104 on the rear wall of said tower, thereby allowing the water to drain from the roof of the tower to the roof of the elevator and thence through openings 115 in the cornice slabs 104 of the elevator into down spouts (not shown). As additional strengthening means, each slab 123 has reinforcing bars 131 embedded therein and extending longitudinally thereof, some being located near one surface of said slab and others near the other surface thereof. Some of the bars 131 that are located near each surface of said slab have their ends bent, so as to cross one another within the posts 124 borne by said slab. Reinforcing bars 132 extend vertically in slab 123 and some of same are located near one surface of said slab and others near the other surface thereof. Bars 133 are arranged to extend vertically in each post 124 and some are located near the corners thereof, a bar or bars 134, also, embedded in said post being bent so as to encircle either some or all of said bars 133.

Some of the slabs 28 in the front wall of the tower 15 and some of the slabs 28 in the middle panel of wall 4 beneath the front wall of the tower have windows 136 located in openings therein, in order to afford access for light into the bin 8 in which the elevating machine is located, and some of the slabs 123 and 28 in the side and rear walls of the tower have openings 137 to allow the spouts 17 to extend therethrough. The ends of the tie-rods 31, 39, 54, 57, 127, and 128 are screw-threaded to receive nuts 138, 139, 140, 141, 142, and 143 and washers 144, 145, 146, 147, 148, and 149, respectively, by means of which said tie-rods and the slabs that constitute the walls in which same are located are held in place.

It is to be observed that the monolithic, unitary concrete structure hereinabove described is suitable for use not only in elevators and tanks having nine bins or compartments, but, also, in the construction of elevators and tanks having either more or less than nine bins or compartments. It is, also, to be observed that the slabs herein referred to may be made at any desired place, but preferably away from the location where the elevator or tank in which they are used is being constructed.

One great advantage arising from the manner of constructing the elevator with individually-molded slabs, as hereinabove described, resides in the fact that the forms for the slabs can be used repeatedly and the slabs can be surfaced better than the walls of an elevator that are molded *in situ.* Another advantage resides in the fact that the reinforcing bars can be more accurately placed in the slabs and, also, that the walls of the elevator can be constructed thinner than can be monolithically constructed. A saving in cost and labor results from the use of this construction, for the reason that the necessity of building forms the entire height of the building and hoisting the materials to the various parts of the building is obviated.

As hereinabove described in detail, the wall slabs are reinforced with embedded steel bars to withstand the outward pressure of the grain and so carry one-half of the load to each pilaster or column. These pilasters are in turn reinforced with embedded steel bars to carry this load to the horizontal rods or bolts. The pressures due to the grain being equal on any four walls of a bin the structure of course is self-contained or in equilibrium.

I claim:

1. A concrete elevator having a plurality of bins, the walls of which consist of individually-molded slabs arranged in interlocking engagement, slabs resting on the outer walls and constituting the cornice, said cornice slabs having shoulders on the inner faces thereof, shoulders borne by the upper slabs of the inner walls, slabs resting on the shoulders on the cornice slabs and, also, on the shoulders on the upper slabs of the inner walls, there being a space between the inner faces of said cornice slabs and the edges of the roof slabs adjacent thereto and, also, a space above each inner wall and between the edges of the roof slabs adjacent thereto, and a concrete filler for said spaces adapted to set integrally with said roof and cornice slabs and, also, with the upper slabs of the inner walls.

2. A concrete elevator having a plurality of bins, the walls of which consist of individually-molded slabs arranged in interlocking engagement, slabs resting on the outer walls and constituting the cornice, said cornice slabs having shoulders on the inner faces thereof, shoulders borne by the upper slabs of the inner walls, the shoulders on the cornice slabs above two opposite outer walls and the shoulders on the upper slabs of each inner wall extending in the same direction therewith being arranged to slope downwardly and to register in substantially the same inclined plane, slabs resting on the shoulders on said cornice slabs and the shoulders on the upper slabs of the inner walls and constituting the roof, there being a space between the inner faces of said cornice slabs and the edges of said roof slabs adjacent thereto and, also, a space above each inner wall and between the edges of said roof slabs adjacent thereto, and a concrete filler for said spaces adapted to set integrally with said roof and cornice slabs and, also, with the upper slabs of the inner walls, there being an opening in one of the cornice slabs adjacent the low side of the roof to afford a drainage for the roof.

3. A concrete elevator having a plurality of bins, the walls of which consist of individually-molded slabs arranged in interlocking engagement, slabs resting on the outer walls and constituting the cornice, said cornice slabs having shoulders on the inner faces thereof, shoulders borne by the upper slabs of the inner walls, the shoulders on the cornice slabs above two opposite outer walls and the shoulders on the upper slabs of each inner wall extending in the same direction therewith being arranged to slope downwardly and to register in substantially the same inclined plane, slabs resting on the shoulders on said cornice slabs and the shoulders on the upper slabs of the inner walls and constituting the roof, there being a space betwen the inner faces of said cornice slabs and the edges of said roof slabs adjacent thereto and, also, a space above each inner wall and between the edges of the roof slabs adjacent thereto, and a concrete filler for said spaces adapted to set integrally with said cornice and roof slabs and, also, with the upper slabs of the inner walls, each end cornice slab on the outer wall adjacent the low side of the roof having a drainage opening.

4. A concrete elevator having a plurality of bins, the walls of which consist of individually-molded slabs arranged in interlocking engagement, slabs resting on the outer walls and constituting the cornice, said cornice slabs having shoulders on the inner faces thereof, shoulders borne by the upper slabs of the inner walls, the shoulders on the cornice slabs above two opposite outer walls and the shoulders on the upper slabs of each inner wall extending in the same direction therewith being arranged to slope downwardly and to register in substantially the same inclined plane, slabs resting on the shoulders on said cornice slabs and the shoulders on the upper slabs of the inner walls and constituting the roof, there being a space between the inner faces of said cornice slabs and the edges of said roof slabs adjacent thereto and, also, a space above each inner wall and between the edges of the roof slabs adjacent thereto, and a concrete filler for said spaces adapted to set integrally with said cornice and roof slabs and, also, with the upper slabs of the inner walls, each end cornice slab on the outer wall adjacent the low side of the roof having a drainage opening, the concrete filler in the space adjacent the cornice slabs at the low side of the roof being arranged to slope downwardly from the middle thereof toward each drainage opening.

5. A concrete elevator having a plurality of bins, the walls of which consist of individually-molded slabs arranged in interlocking engagement, slabs resting on the outer walls and constituting the cornice, the walls of one of the bins being continued higher than the cornice to form, a tower, slabs supported by the cornice slabs and the upper slabs of the inner walls and constituting the roof, slabs resting on the walls of the tower and constituting the cornice therefor, the cornice slabs on the tower having shoulders on the inner faces thereof, slabs resting on said shoulders and constituting the roof of the tower, there being a space between the inner faces of the cornice slabs on the tower and the edges of the roof slabs adjacent thereto, and a concrete filler for said space adapted to set integrally with the cornice and roof slabs of the tower, the shoulders on the cornice slabs on two opposite walls of the tower being arranged to slope downwardly and to register in substantially the same inclined plane, and the cornice slab on the wall of the tower that is adjacent the low side of the roof of same being provided with a drainage opening.

6. In a concrete elevator, the combination of a plurality of slabs arranged in interlocking engagement to form the walls of a bin, slabs resting on the walls and constituting the cornice, said cornice slabs having shoulders on the inner faces thereof, slabs resting on said shoulders and constituting the roof, there being a space between the inner faces of the cornice slabs and the edges of the roof slabs adjacent thereto, and a concrete filler for said space adapted to set integrally with said cornice and roof slabs, the shoulders on the cornice slabs on two opposite walls being arranged to slope downwardly and to register in substantially the same inclined plane, and the cornice slab adjacent the low side of the roof being provided with a drainage opening that registers with said concrete filler.

7. In a concrete elevator, the combination of a plurality of slabs arranged to form two adjoining walls of a bin, posts borne by the ends of each slab of one wall and having grooves in which the ends of each slab of the other wall fit, each of said slabs having a groove in the top and bottom thereof, and tie-rods extending through the grooves in the tops and bottoms of said slabs and holding the same in place, the junctions of the slabs of one wall being approximately half way between the junctions of the slabs of the other wall, and the posts on the slabs of one wall being provided with openings between their ends to allow the tie-rods between the slabs of the other wall to pass therethrough.

8. In a concrete elevator, a wall composed of a pair of panels, each panel comprising a plurality of slabs, each of said slabs having a pair of flanges adjacent the adjoining ends thereof, there being spaces between the flanges on the slabs of one panel and the flanges on the slabs of the other panel, slabs having their ends fitting in the spaces between said flanges and constituting the panels of a wall disposed at an angle to said first-mentioned wall, the junctions of the slabs of each panel of said first-mentioned wall being approximately half way between the junctions of the slabs of each panel of said second-mentioned wall, tie-rods extending between the slabs of said first-mentioned wall, and tie-rods extending between the slabs of said second-mentioned wall.

9. In a concrete elevator, a wall composed of a pair of panels, each panel comprising a plurality of slabs, each of said slabs having a pair of flanges adjacent the adjoining ends thereof, there being spaces between the flanges on the slabs of one panel and the flanges on the slabs of the other panel, slabs having their ends fitting in the spaces between said flanges and constituting the panels of a wall disposed at an angle to said first-mentioned wall, the junctions of the slabs of each panel of said first-mentioned wall being approximately half way between the junctions of the slabs of each panel of said second-mentioned wall, tie-rods extending between the slabs of said first-mentioned wall, tie-rods extending between the slabs of said second-mentioned wall, there being a space between the ends of the slabs of said first-mentioned wall, and a concrete filler for said last-mentioned space adapted to set integrally with the ends of all of said slabs.

10. A concrete elevator including front, rear and side walls each formed of series of superimposed slabs, the end slabs of the front and rear walls having their outer ends formed with integral posts grooved on their inner faces, partition walls composed of series of superimposed slabs arranged within said front, rear and side walls and disposed at right angles to each other, the outer ends of the partition walls having posts integral therewith which posts are grooved on their opposite sides, the slabs of the side walls being received in said grooves of the posts of the partition walls and in the grooves of the posts of the front and rear walls, the inner ends of the end slabs of the front and rear walls being received in the grooves of the posts of the adjacent partition walls, intermediate series of slabs of the front and rear walls being received in the grooves of the posts of the partition walls, the abutting tops and bottoms of the slabs of the partition walls and said front, rear and side walls being grooved, tie rods arranged in said grooves and having their free ends threaded and projecting beyond the posts of the front, rear and partition walls, and nuts on the threaded ends of said tie rods abutting the posts of the front, rear and partition walls.

11. In concrete construction, front, rear and side walls, vertical slabs on all of said walls having shoulders on their inner faces, partition walls arranged within said front, rear and side walls at right angles to each other, said partition walls having tenons and shoulders on the opposite side faces of the tenons, and horizontal slabs seating on said shoulders of the front, rear and side walls and the shoulders of the partition walls and abutting the tenons of the latter, the sides and ends of the horizontal slabs adjacent the vertical slabs being spaced from the inner faces of the latter to form spaces, and the sides and the ends of the horizontal slabs adjacent the partition walls being spaced from each other by said tenons thereof to form spaces, and grout arranged in all of said spaces.

12. In concrete construction, outer walls, vertical slabs seating on said walls and formed with shoulders that project inwardly therefrom, roof slabs that seat on the shoulders and are inclined downwardly from one of the outer walls to the opposite of the outer walls, the outer ends of the roof slabs at the lowest end of the roof being spaced from the inner faces of the adjacent vertical slabs, the outer vertical end slabs at the low end of the roof being formed with drainage openings, and grout in said space, the grout being inclined from its longitudinal center toward each drainage opening.

13. In concrete construction, a plurality of walls formed of vertical slabs, the slabs of two opposite walls having their outer ends formed with integral posts that are grooved on one of their faces to receive the outer ends of the slabs of the other walls, all of said slabs having their abutting edges longitudinally grooved and arranged so that the abutting edges of the slabs of one wall are disposed substantially central of the lengths of the posts of the adjacent wall and tie-rods arranged in said grooves and extending centrally and transversely through said posts and secured thereto at their ends.

14. In concrete construction, a wall formed of slabs that have posts integral with an end thereof, said posts being grooved on their inner faces, a wall at an angle to said first named wall formed of slabs that have their outer ends adjacent said posts extending into the grooves thereof, the longitudinal abutting edges of the slabs of the second named wall being disposed approximately central of the ends of the posts of the first named wall, tie-rods extending between the abutting edges of the slabs of the first named wall and also extending between the abutting ends of the posts of said first named wall, tie-rods extending between the abutting edges of the slabs of the second named wall and extending through the posts of the first named wall at the sides thereof adjacent to those through which the first named tie-rods extend, and means on the tie-rods to abut said posts at said sides thereof.

15. In concrete construction, a pair of opposed slabs each having a pair of flanges at one end and on opposite sides thereof, a tenon between each pair of flanges projecting therebeyond, the outer ends of the tenons of said slabs being located opposite each other, and a second pair of opposed slabs having their adjoining ends spaced apart and projecting in the space between the opposed flanges of the first named slabs, and located on opposite sides of the tenons of said first mentioned slabs.

16. In a concrete structure, a wall composed of a pair of panels, each panel comprising a plurality of slabs, each of said slabs having a tenon projecting outwardly from one end thereof, a flange on each side of each slab adjacent said tenon, the tenons of the slabs of the panels being disposed adjacent to each other, and the adjacent flanges of adjacent slabs being spaced apart, and slabs on the opposite sides of the first named wall having their ends fitting in the spaces between said flanges and contacting with the tenons thereof.

In testimony whereof I hereunto affix my signature in the presence of two witnesses.

JOHN E. CONZELMAN.

Witnesses:
D. P. LANE,
ARCHER W. RICHARDS.